United States Patent
Petitto et al.

(10) Patent No.: US 6,313,946 B1
(45) Date of Patent: Nov. 6, 2001

(54) TECHNIQUE FOR DEPTH OF FIELD VIEWING OF IMAGES USING AN ASPHERICAL LENS

(76) Inventors: Tony Petitto, 346 N. Palm Dr., Beverly Hills, CA (US) 90210; Stanislaw Loth, 44 Normandy Village, Apt. 14, Nanuet, NY (US) 10954

(*) Notice: Subject to any disclaimer, the term of this patent is extended or adjusted under 35 U.S.C. 154(b) by 0 days.

(21) Appl. No.: 09/501,313

(22) Filed: Feb. 10, 2000

Related U.S. Application Data

(63) Continuation of application No. 09/006,894, filed on Jan. 14, 1998, now Pat. No. 6,067,191, which is a continuation-in-part of application No. 08/345,806, filed on Nov. 22, 1994, now Pat. No. 5,774,260, which is a continuation-in-part of application No. 08/155,748, filed on Nov. 23, 1993, now Pat. No. 5,400,177.

(51) Int. Cl.[7] .......................... G03B 21/56; G03B 21/60; G02B 13/18; H04N 5/72

(52) U.S. Cl. .................... 359/451; 359/454; 359/460; 348/832

(58) Field of Search ...................... 359/455, 456, 359/457, 443, 454, 460, 451, 708, 716; 348/747, 777, 781, 786, 806, 832

(56) References Cited

U.S. PATENT DOCUMENTS

| | | | |
|---|---|---|---|
| 2,449,886 | 9/1948 | Dougherty | 88/39 |
| 2,889,739 | 6/1959 | Moore | 88/16.6 |
| 2,891,444 | 6/1959 | Ewald | 88/29 |
| 3,784,742 | 1/1974 | Burnham et al. | 178/7.88 |
| 3,800,085 | 3/1974 | Ambats et al. | 178/7.91 |
| 3,820,873 | 6/1974 | Redington et al. | 350/124 |
| 4,078,854 | 3/1978 | Yano | 350/128 |
| 4,158,481 | 6/1979 | Hoyer | 350/144 |
| 4,309,074 | 1/1982 | Granieri, Jr. | 350/144 |
| 4,391,495 | 7/1983 | Mazurkewitz | 350/452 |
| 4,414,565 | 11/1983 | Shanks | 358/89 |
| 4,536,056 | 8/1985 | Oguino | 350/128 |
| 4,621,897 | 11/1986 | Bonnet | 350/130 |
| 4,708,435 | 11/1987 | Yata et al. | 350/129 |
| 4,772,094 | 9/1988 | Sheiman | 350/286 |
| 4,871,233 | 10/1989 | Sheiman | 350/133 |
| 4,927,238 | 5/1990 | Green et al. | 350/130 |
| 5,061,052 | 10/1991 | DeJesus | 359/742 |
| 5,146,365 | 9/1992 | Minoura et al. | 359/619 |
| 5,353,070 | 10/1994 | Mitani et al. | 348/781 |
| 5,400,177 | 3/1995 | Petitto et al. | 359/451 |
| 5,579,164 | 11/1996 | Chapnik | 359/618 |
| 5,585,867 | 12/1996 | Ooya | 348/781 |
| 5,617,152 | 4/1997 | Stolov | 348/761 |
| 5,774,260 | 6/1998 | Petitto et al. | 359/451 |

FOREIGN PATENT DOCUMENTS

| | | | |
|---|---|---|---|
| 40 06 868 A1 | 9/1991 | (DE) | G02B/27/22 |
| 2184286 | 6/1987 | (GB) | H01J/31/22 |
| WO81/01201 | 4/1981 | (WO) | G03B/21/00 |

OTHER PUBLICATIONS

Pole, R.V. et al., *Real Time Computer–Generated 3–D Display*, IBM Technical Disclosure Bulletin, vol. 10, No. 5, pp. 601–603 (Oct. 1967).

*Primary Examiner*—Christopher E. Mahoney

(57) ABSTRACT

A screen is disclosed for viewing depth of field images. The screen includes a prismatic screen mounted between a flat image and a viewer. Additional optical elements may be provided to enlarge a viewed image. A light hood may be provided to reduce glare and other effects of ambient light. Coating the screen with an anti-reflective coating may provide further protection from ambient light. Restructuring the image into smaller image elements provides image quality for a video image or the like. An aspherical lens may be used to minimize or remove distortion of the image perceived by a viewer to the side, above or below the center viewing axis of the screen. The present invention may find particular application in computer monitor systems, medical and obstetric imaging such as sonograms, musculo-skeletal imaging, vascular imaging, angiograms, angioplasty, dental probes, catheter probes, ear probes, endoscopy, laparoscopy, pelviscopy and arthroscopy.

25 Claims, 27 Drawing Sheets

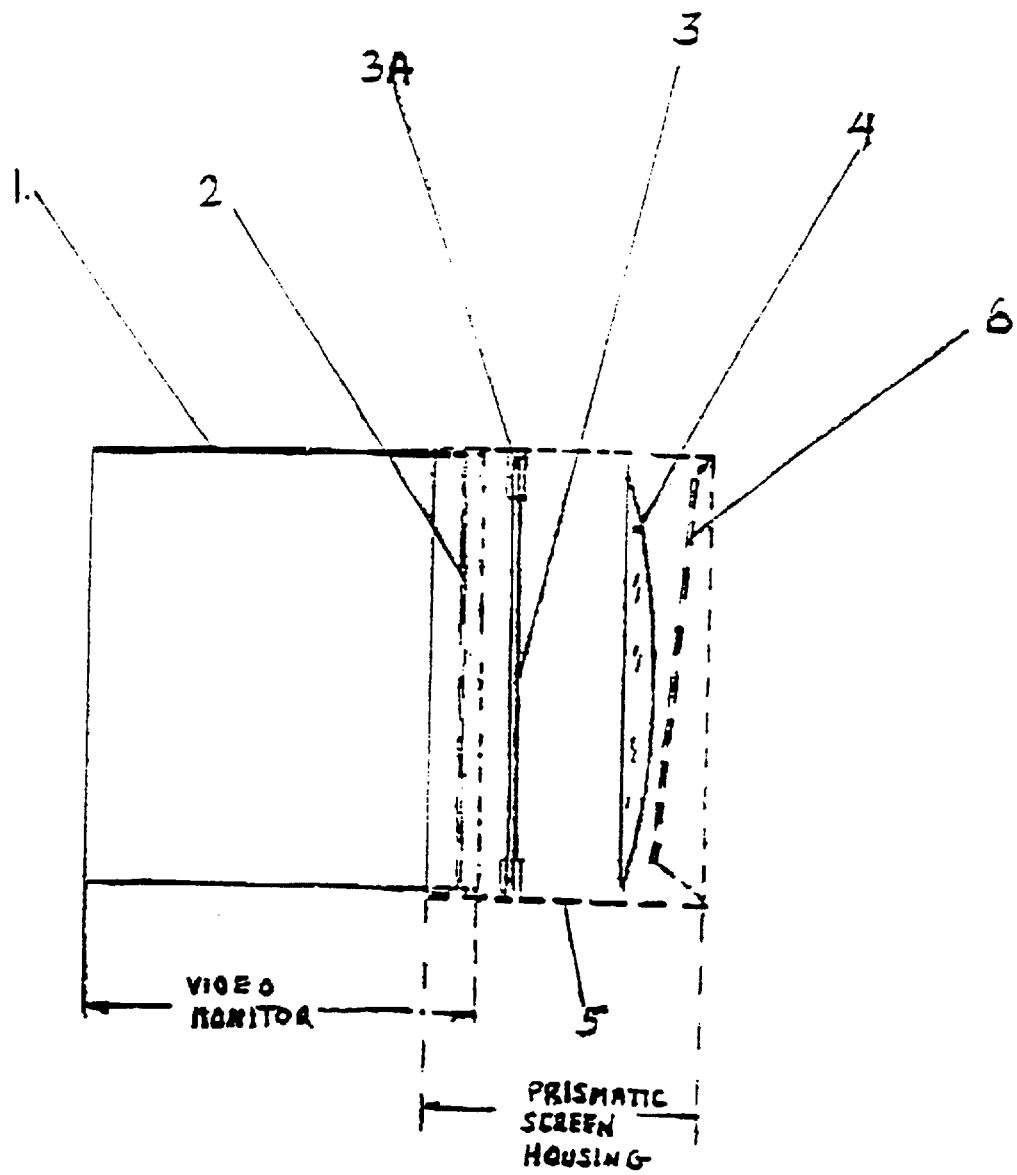
FIG#1.

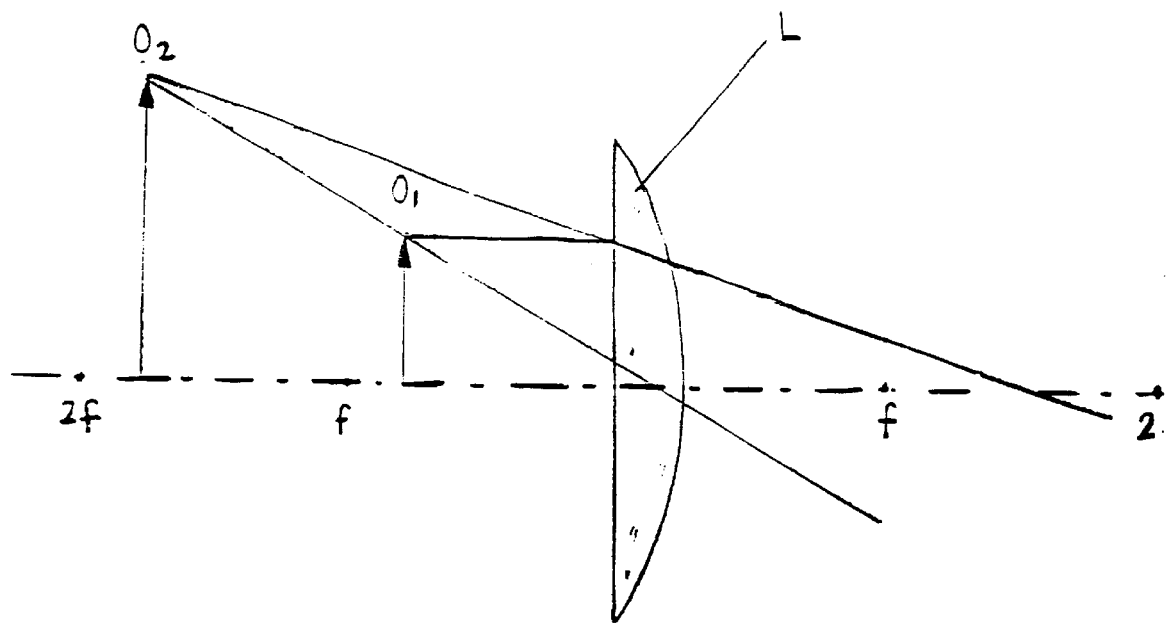
FIG #2

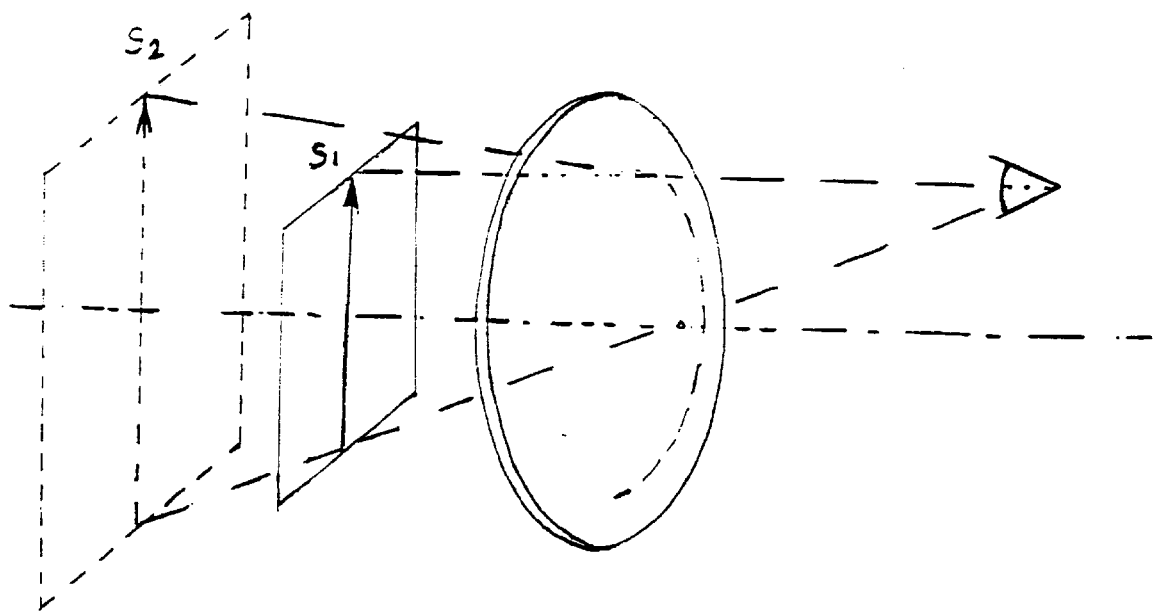
FIG #3

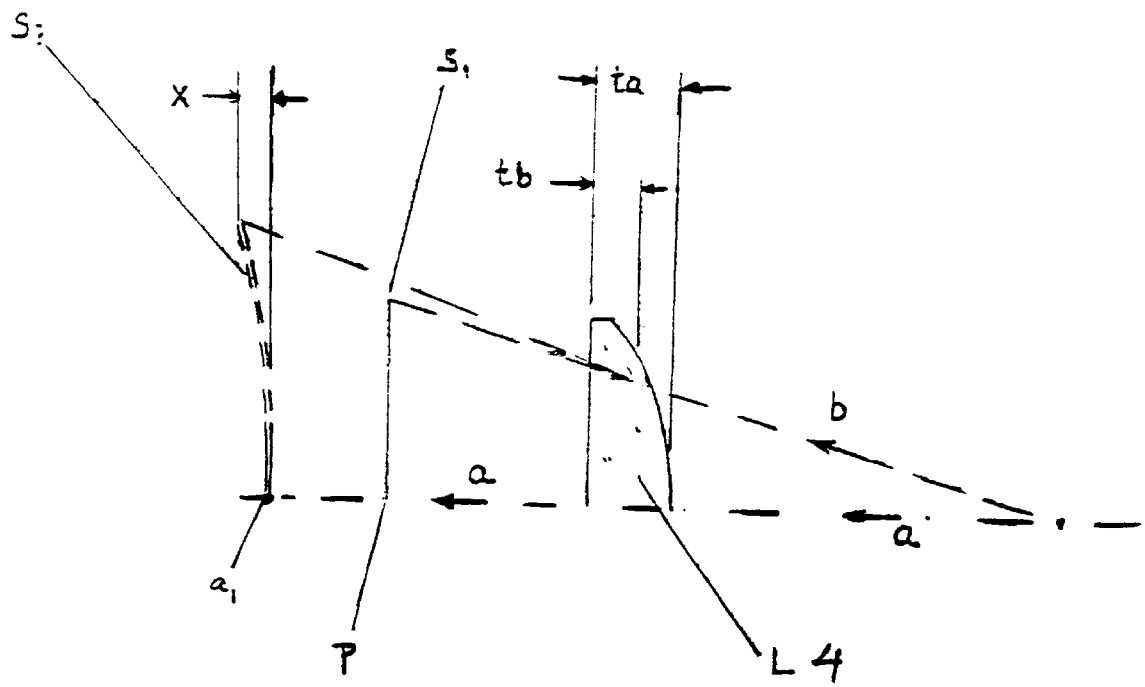
FIG #4

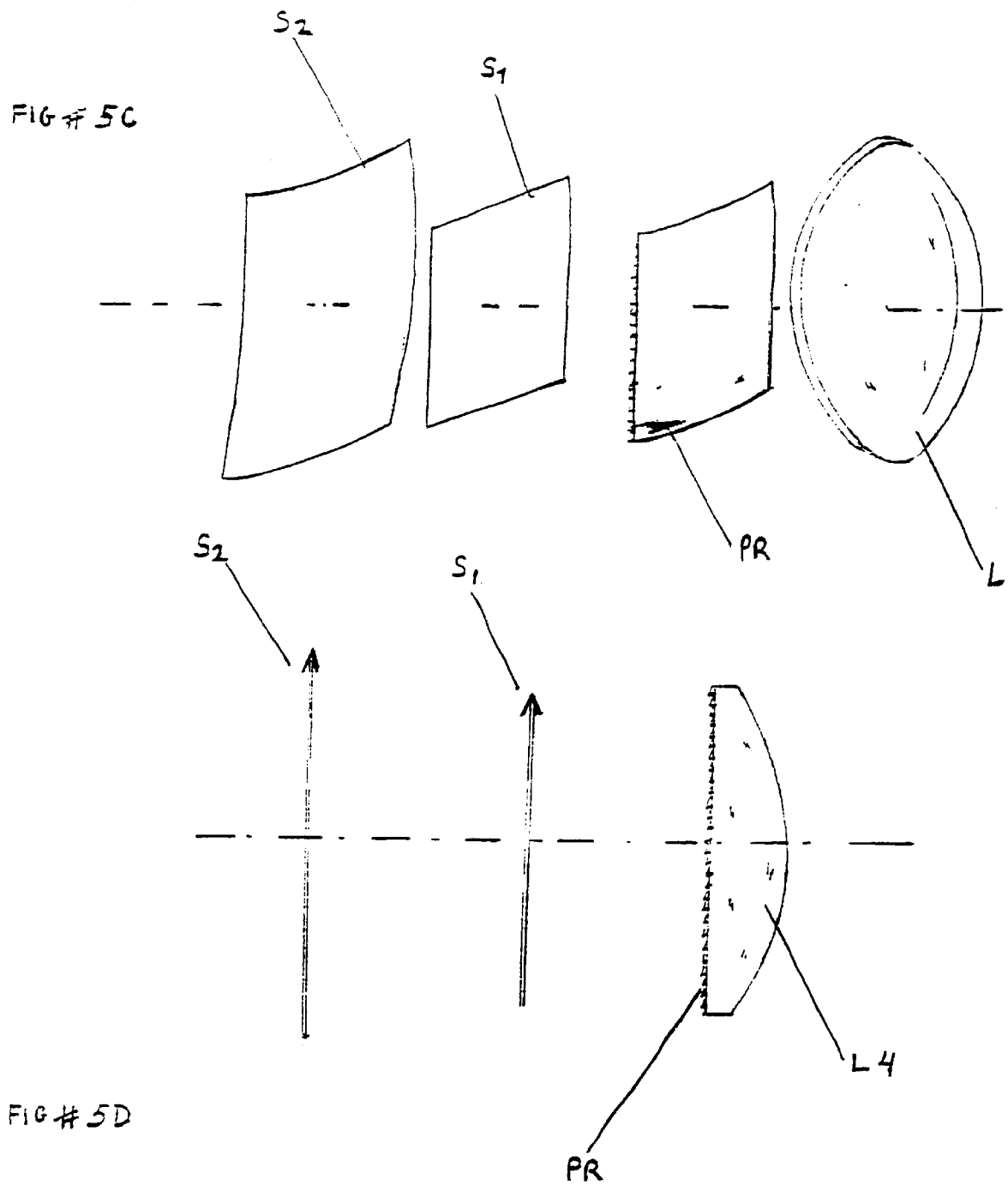

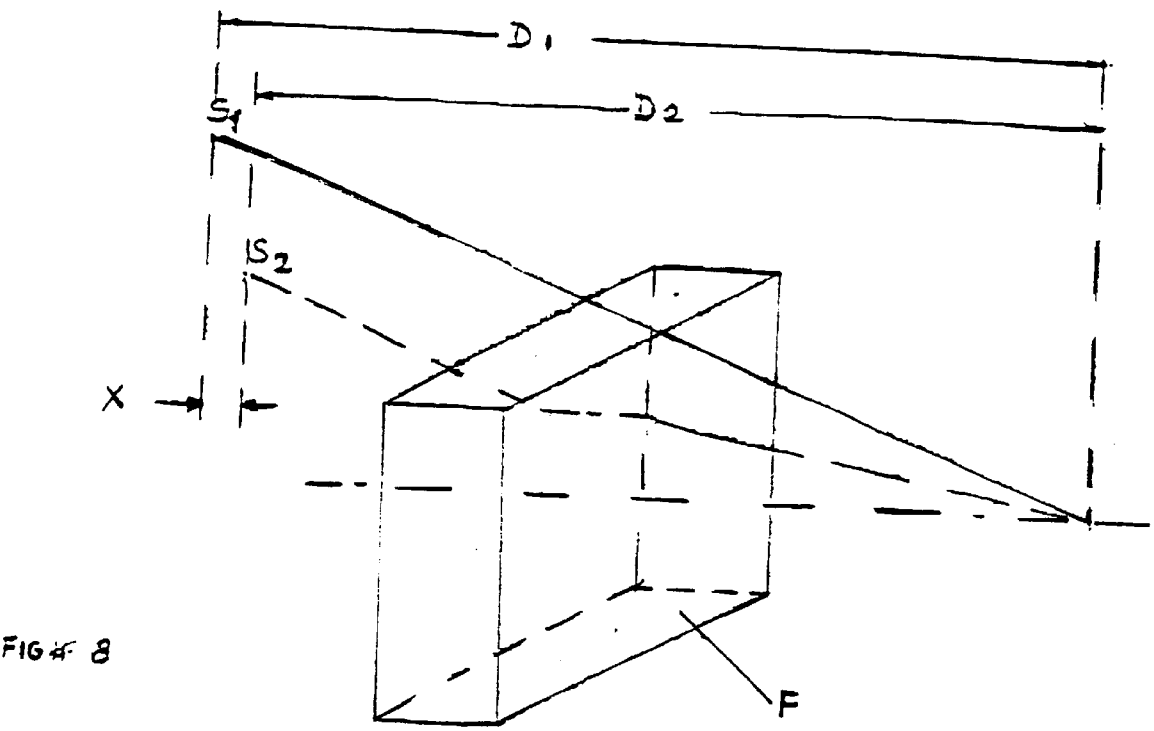
FIG # 8
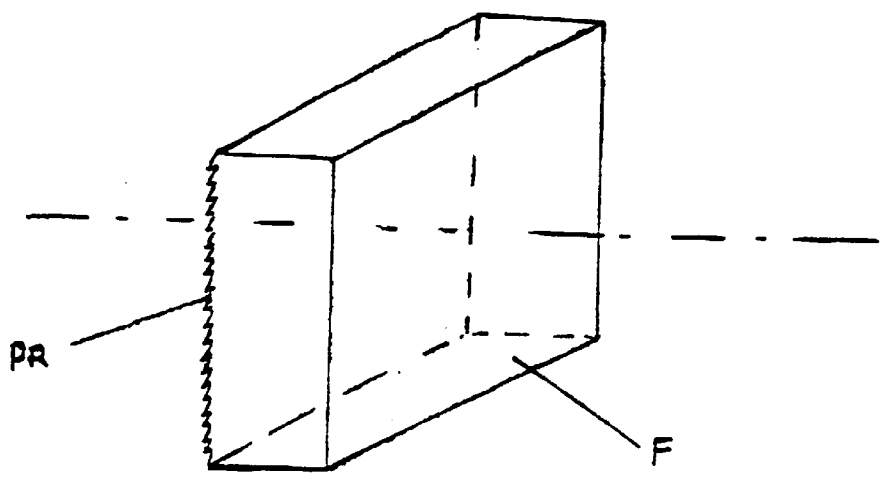
FIG # 9

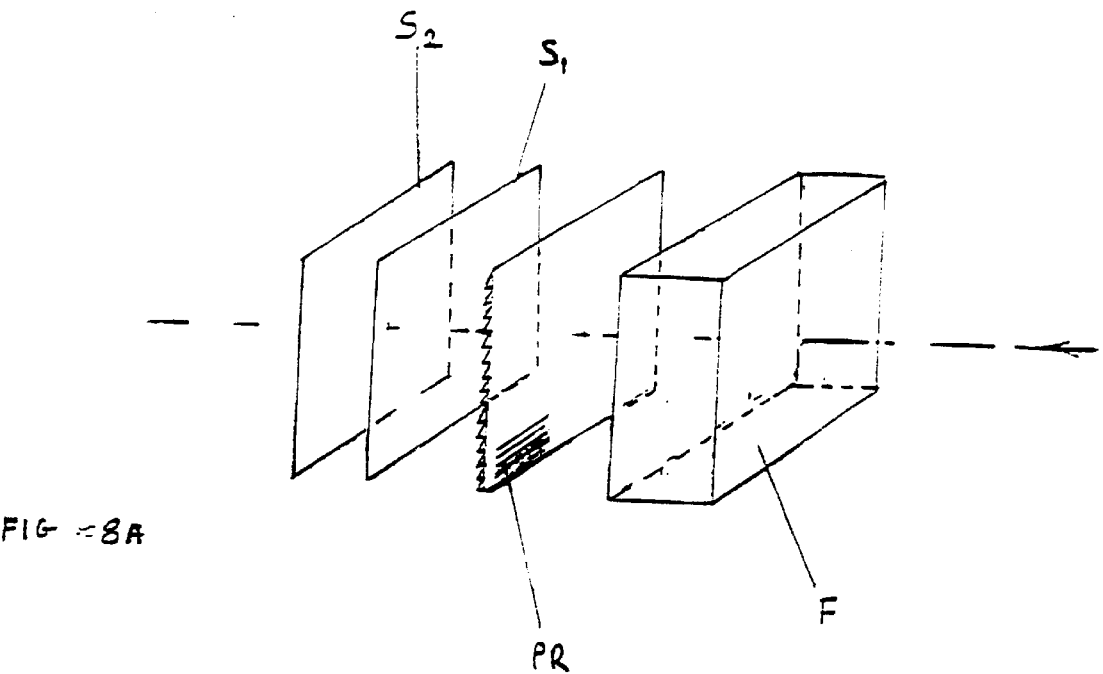
FIG=8A
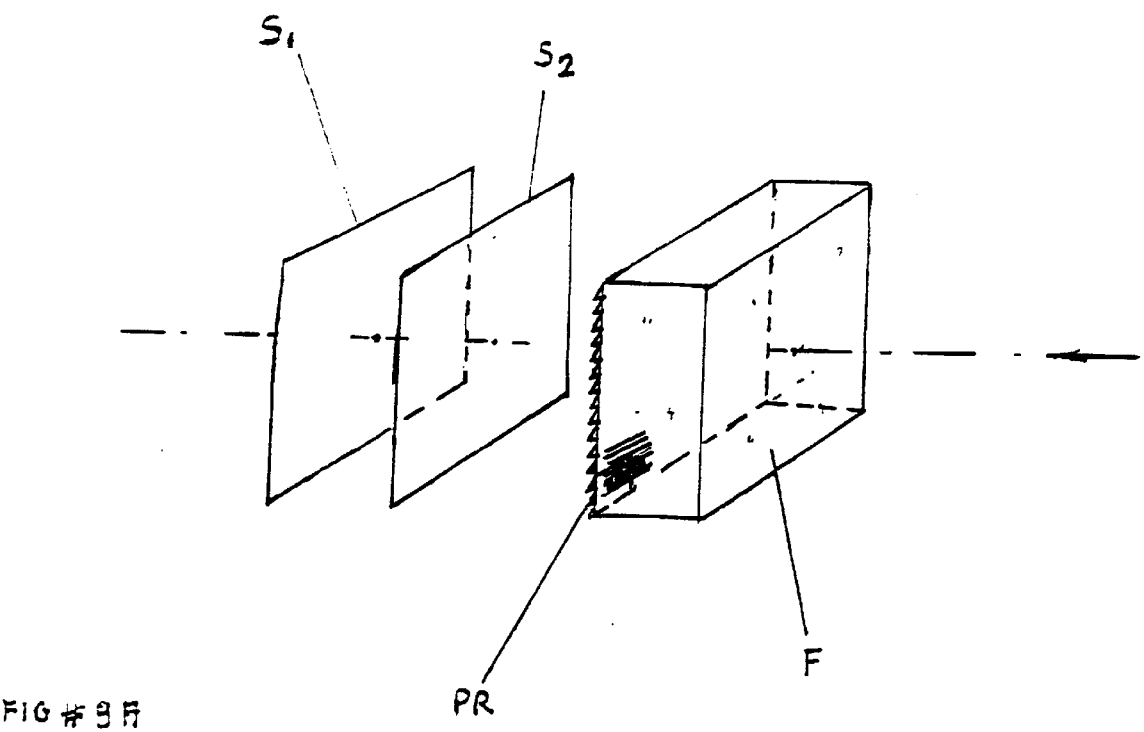
FIG#9A

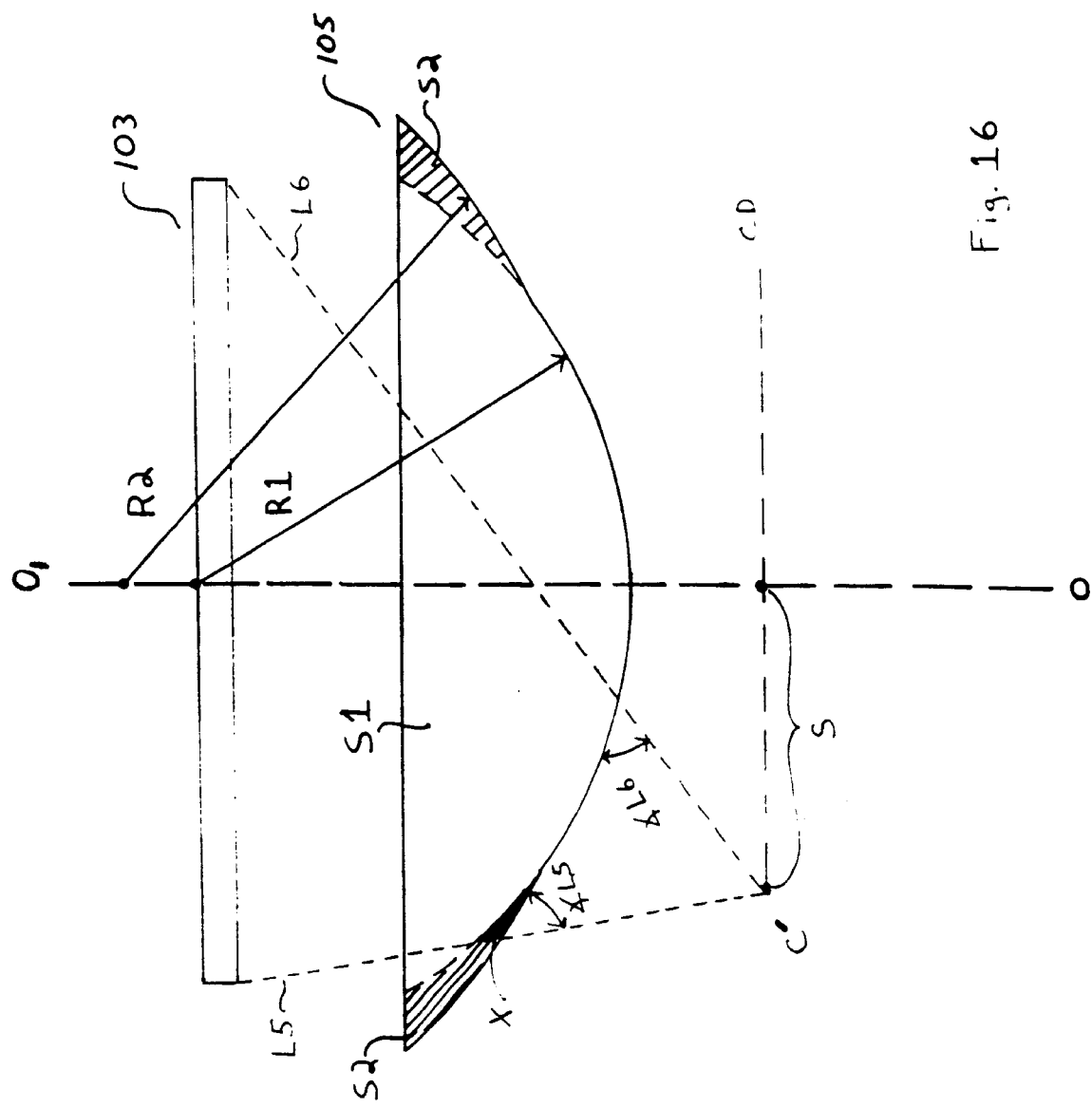

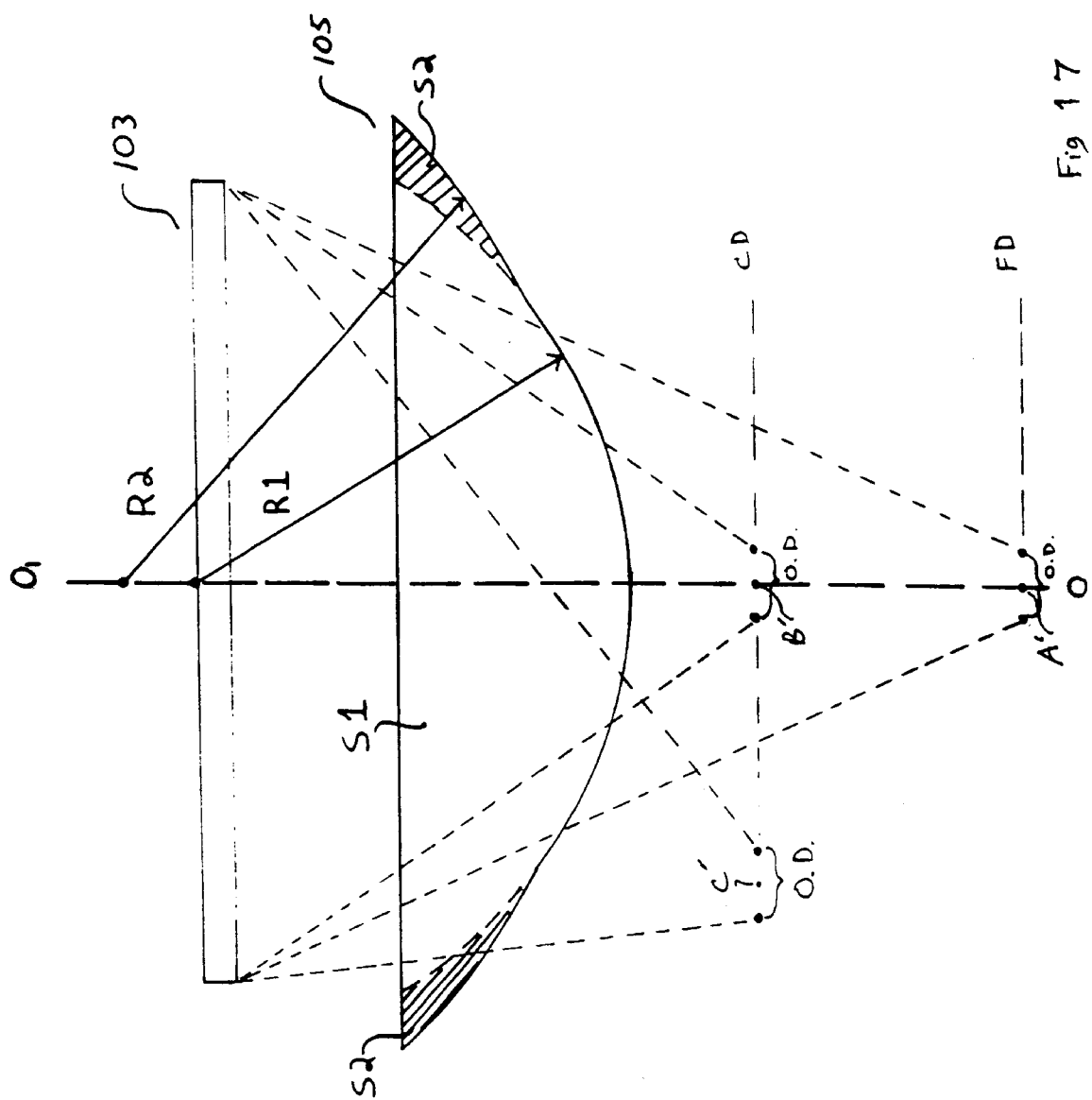

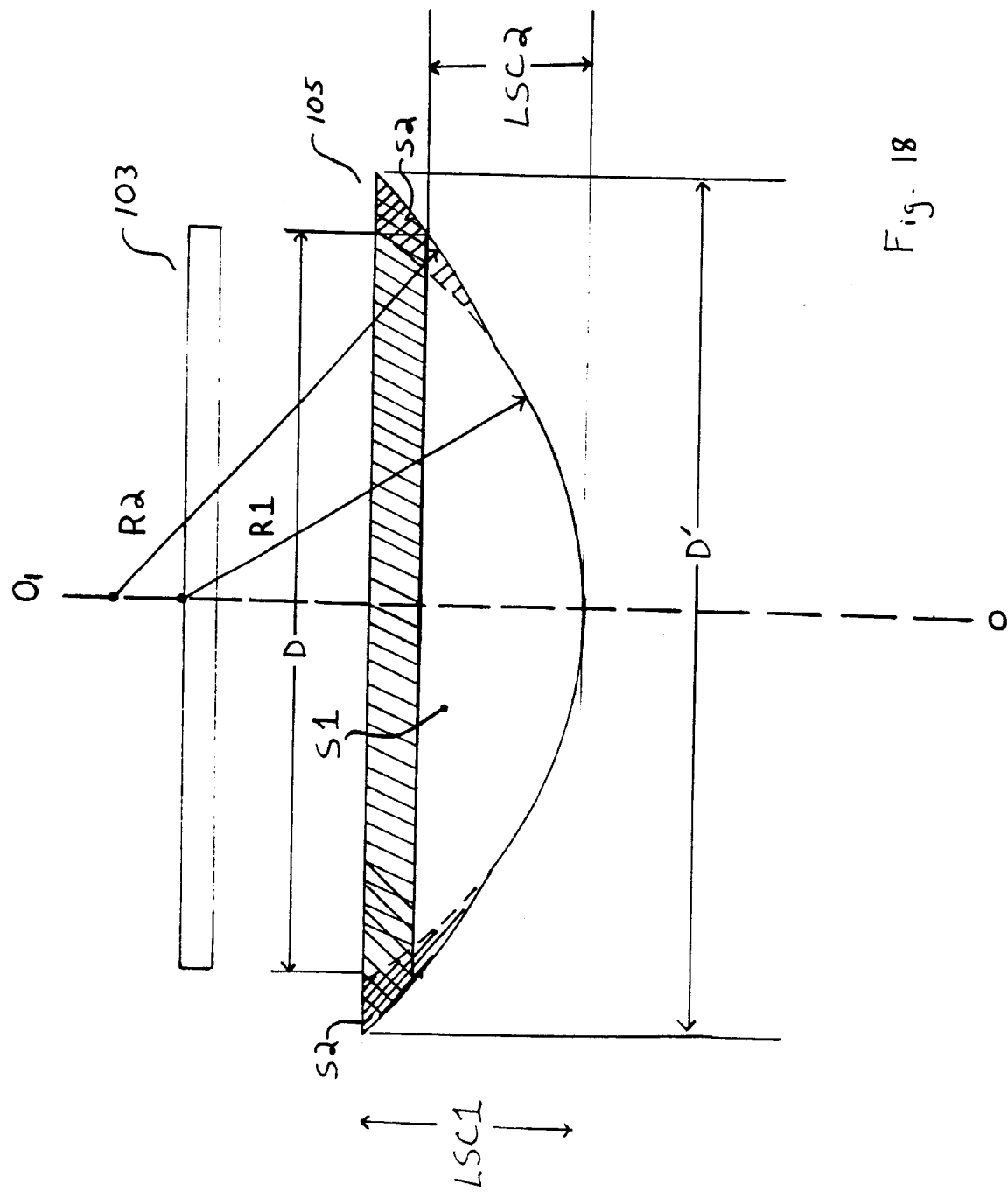

TECHNIQUE FOR DEPTH OF FIELD VIEWING OF IMAGES USING AN ASPHERICAL LENS

The present application is a continuation of U. S. patent application Ser. No. 09/006,894, filed Jan. 14, 1998 U.S. Pat. No. 6,067,191, which is a continuation-in-part of U.S. patent application Ser. No. 08/345,806, filed Nov. 22, 1994, now U.S. Pat. No. 5,774,260, which is a continuation-in-part of U.S. patent application Ser. No. 08/155,748, filed Nov. 23, 1993, now U.S. Pat. No. 5,400,177, each of which is incorporated herein by reference in its entirety.

BACKGROUND OF THE INVENTION

Depth of field viewing, as described in U.S. Pat. No. 5,400,177, is accomplished by enhancing depth cues which are present in every flat image, whether photographed or recorded electronically, without the requirement of special glasses, eye shutters or similar devices used in front of the viewers eyes. The depth cues are enhanced by a specially designed prismatic screen that separates the viewer's eye focus and convergence. The separation triggers the brain of the viewer to disregard convergence information indicating that the screen is flat, and to interpret the image depth cues as real.

To strengthen the focus and convergence separation and add additional image magnification, the preferred embodiment of the present invention utilizes a specially designed magnifying lens as a supplement to the prismatic screen. The lens helps trigger the eye focus and convergence separation—making it stronger when combined with a prismatic screen such as is disclosed in U.S. patent application Ser. No. 08/155,748, filed Nov. 23, 1993, now U.S. Pat. No. 5,400,177. In addition, depending upon the particular design of the lens, the viewed image may magnified from 1.25× to 2.×, and at the same time is cleared (cleaned) from the magnified raster of the video scanning lines. The clearing (cleaning) of the viewed image from the magnified raster is accomplished with the prismatic screen, as described in the parent application. With particular reference to FIGS. 29 to 36 of that application, the prismatic screen PR preferably includes three miniature prisms for each video scan line. As a result, each raster video scan line is divided two or three times, thereby providing a significant reduction in the visibility of the raster lines. In accordance with the present invention, as described in greater detail below, the prismatic screen may be either a flat or curved structure, depending upon the choice of additional optical elements in the system.

A number of designs on how to magnify a video small screen image to a larger screen image are described in patent literature. For example U.S. Pat. No. 2,449,886 and U.S. Pat. No. 5,061,052 disclose such systems. Each of these designs are based on using a positive lens, or a lens combined with a Fresnel lens, and each technique places the optical system near the front of the video monitor screen. The lenses are designed with a short focal length which may cause distortion, because the magnification of the image is not equal in the center and on the edges. Additionally, the Fresnel lens, which is a concentric design of a magnifying lens, may cause image degradation by lowering the image resolution. According to U.S. Pat. No. 5,061,052, the described system is intended to allow individuals of limited means to enjoy the entertainment and education provided by large screen television images, without the necessity of purchasing a large television set. However, such prior art television magnification of a small screen image to a larger screen image may cause distortion and a poor image, particularly since these systems magnify the raster of scanned video lines which make up the image. When the lines are magnified, the image is degraded and becomes distorted, and eyestrain may result. These and other disadvantages of the prior art are overcome by the present invention.

BRIEF OBJECTS AND SUMMARY OF THE INVENTION

It is a primary object of the present invention to provide depth of field viewing of video images on any size video monitor.

It is a further object of the present invention to provide a system that is designed optically to enhance depth cues and to give additional detailed information about the viewed image.

It is another object of the present invention to provide a magnification of the image which separates the viewer's eye focus and convergence.

It is yet another object of the present invention to provide a magnification for any size television screen image which is not more than 1.25× to 2.0×, which is below measurable magnification distortion, without magnifying the visibility of the space between scan lines.

It is yet another object of the present invention to minimize or remove distortion of the depth cue-enhanced image perceived by a viewer to one side, above, or below the center viewing axis of the present invention.

The preferred embodiment of the present invention achieves these and other objects with a system that includes a prismatic screen which causes a viewer to interpret depth cues present in a flat image as if they provided real depth information. Magnification of the image and increased image quality may be provided in accordance with the present invention by a magnifying lens arranged adjacent the prismatic screen. Special housings and optical coatings may be provided to further enhance image quality. Additionally, the housing and optical elements may be tilted to strengthen the depth cue information. Also, an aspherical lens may be used to minimize or remove distortion of the image perceived by a viewer to the side, above or below the center viewing axis of the present invention.

BRIEF DESCRIPTION OF THE DRAWINGS

The foregoing objects, as well as additional objects, features and advantages of the present invention, will be apparent from the following detailed description of the preferred embodiments when read in light of the accompanying drawings, wherein:

FIG. 1 is an illustration of the present invention including the magnifying lens 4;

FIG. 2 is an illustration of how a plano convex lens magnifies an image;

FIG. 3 is an illustration of how the plano convex lens magnifies the video image in accordance with one aspect of the present invention;

FIG. 4 is an illustration of how the magnifying lens 4 enhances the depth cues of the viewed video image;

FIG. 5C is an illustration of an embodiment of the present invention with the lens 4 and the curved prismatic screen "PR" in place;

FIG. 5D is an illustration of an embodiment of the present invention with the lens 4 and the prismatic screen "PR" applied to the plano surface of lens 4;

FIG. 8 is an illustration of the present invention with the lens 4 replaced by a parallel transparent plate;

FIG. 8A is an illustration of an embodiment of the present invention with the prismatic screen "RP" placed behind the transparent plate;

FIG. 9 is an illustration of the present invention with the prismatic screen "PR" attached to the parallel transparent plate;

FIG. 9A is an illustration of the present invention with the parallel transparent plate demonstrating how the viewers eyes see the virtual video image S2, which appears in front of the video screen S1;

FIG. 16 is an illustration of a viewing point shifted to one side of the center axis of a depth of field prismatic screen and an aspherical magnifying lens;

FIG. 17 is an illustration of two viewing points along the center axis of a depth of field prismatic screen and an aspherical magnifying lens as those viewing points are related to left and right eye inter ocular distance;

FIG. 18 is an illustration of the reduction in lens thickness corresponding to use of an aspherical magnifying lens in the present invention;

DETAILED DESCRIPTION OF THE PREFERRED EMBODIMENTS

Figures 5A, 5B:
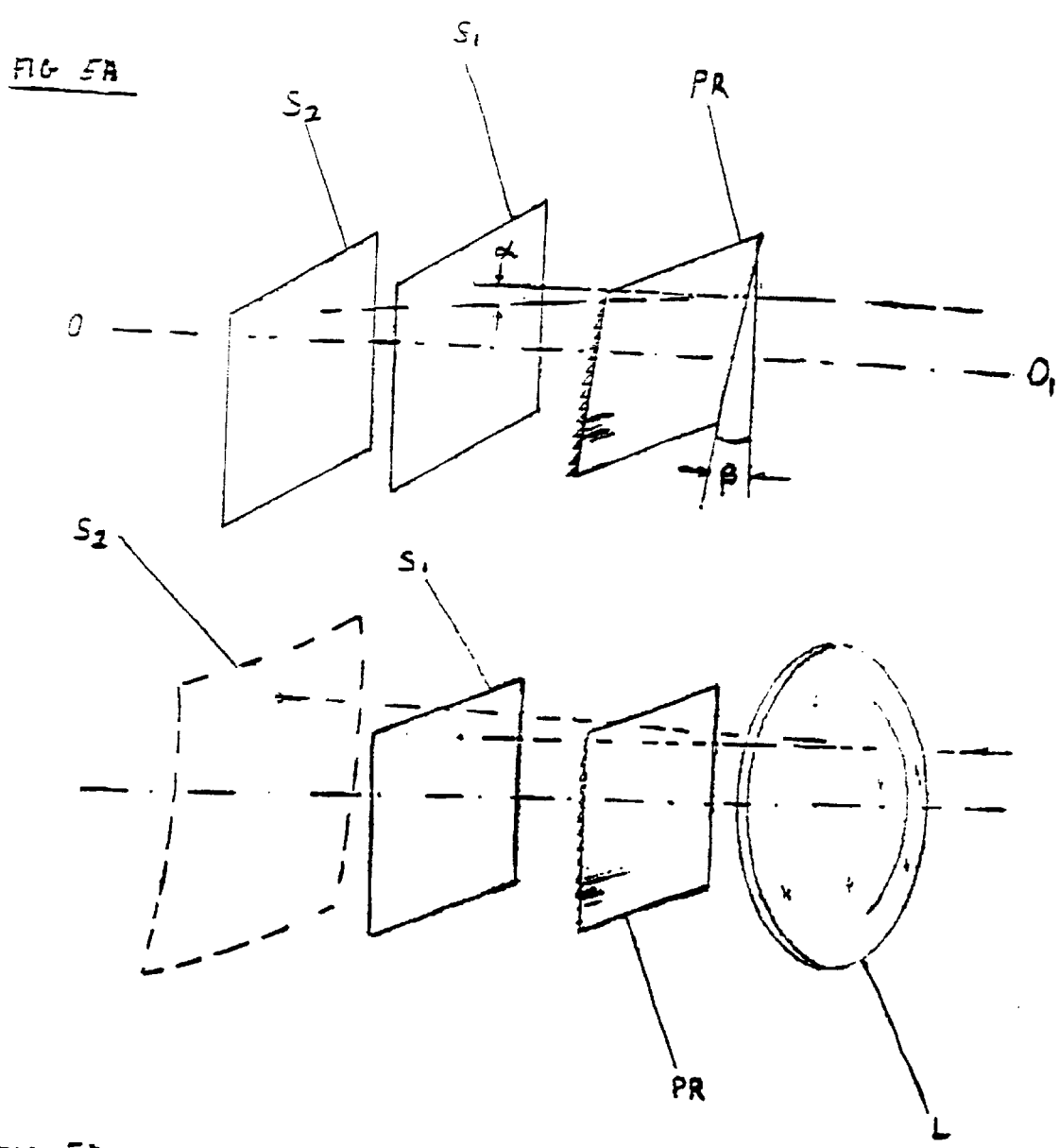
FIG. 5A is an illustration of the location of the prismatic screen in front of the video screen as illustrated in U.S. patent application Ser. No. 08/155,748, filed Nov. 23, 1993, now U.S. Pat. No. 5,400,177.
FIG. 5B is an illustration of one embodiment of the present invention with the lens 4 placed in front of the prismatic screen.

Although the present invention is described below in connection with specific preferred embodiments, it will be appreciated that the invention is not limited to the described embodiments. For example, the present invention is housed and the optical elements are aligned with high precision in a frame that is constructed in height and width to be attached to the front of any existing video monitor. However, other techniques for housing and mounting the optical elements may also be used.

The present invention, when attached to a 19" or 13" medical video monitor, is designed to permit the viewer to observe the 2" diameter, micro endoscopic image as described in U.S. patent application Ser. No. 08/155,748, filed Nov. 23, 1993, now U.S. Pat. No. 5,400,177, magnified 1.25× to 2.0×. The image also appears to the viewer with improved resolution, with enhanced image detail and image depth cues, which are not recognizable in a less detailed video image.

In Laparoendoscopic/Endoscopic surgery procedures, the video image is transmitted directly from the inside of the patient's body to a 19" or 13" video monitor. Of particular importance is Micro Endoscopic procedures that are viewed through a micro fiber optic image conduit. The image is typically taken in a relatively low light environment, and the final image that appears on the 19" medical monitor is only 2" in diameter and is often noisy and characterized by relatively poor resolution quality.

Micro Endoscopic procedures for the Parotid tear duct, Lacrimal tear duct, breast exploration and reconstructive surgery, disorders of the spine, Neurosurgery of the brain and nerve system, inner ear, nose and throat (Otolaryngology), reconstructive plastic surgery, Fallopascopy, Gynecology, reproductive genetics and minimally invasive veterinary surgery are performed using scopes with fiber optic bundles that range in diameter from 0.3 mm to 3.0 mm. These difficult procedures have opened new avenues of improvement on surgery of the human body. Such procedures eliminate the need to open large operation areas and allow one to reach into and see inside very small and narrow body ducts. It also reduces the patient's trauma, stress, danger of infection, and allows the patient in most cases to recover quickly.

With all the latest improvements in the lens, fiber optic, video camera, high-resolution video monitor and actual technique in the different micro procedures the image quality transmitted to the video monitor often remains poor. The relatively poor quality is not only caused by the small size of the viewed image, but also results from poor sharpness and clarity of the image. This is the result of the lens at the end of the fiber optic conduit being only a minimum 1/50th of an inch in diameter of the environment in which the image is taken.

The 2" micro image transmitted through the fiber optic is focused into the video camera as a relatively small and dark image. The image is only 1/6th of the height of a 19" monitor screen, and occupies only 1/40th of the monitor screen surface. However, the 19" monitor is the monitor of choice for most surgeons for Micro Endoscopic procedures because on the 13" monitor the micro image is only 1.25" in diameter. It is often very difficult to perform micro procedures with such a small image.

Both the 19" and 13" medical video monitor images are constructed with the same components, the video image pixels (small electronic dots which form the raster of scanning lines which form the image). Both 19" and 13" basic video monitors contain the same amount of 200 scanning resolution lines. A raster scanning line, which runs the width of the video screen, is approximately 1.0 mm high, 1/25th of an inch; and the space between the raster lines is normally 0.5 mm, 1/50th of an inch. The thickness of the lines and the space between the lines creates 200 scanning lines of basic image resolution that fills, top to bottom, the video monitor screen.

In comparing the video image with a film image, the video image resolution is as much as 15 times lower. Quality photographic lenses are usually manufactured with 100 times better resolution (100 lines per 1.0 mm).

Normal endoscopic video systems project the image to the full size of the video screen. This is because they are not restricted to the 1/24th of an inch diameter of the fiber optic light conduit and are equipped with a powerful light source to illuminate the viewing area. This, however, is impossible to achieve with the micro endoscopic imaging systems.

The micro endoscopic video system is an electronic and optical breakthrough in surgical technique that allows the small, confined areas of the human body like the tear duct and the spinal canal to be imaged. However, the poor image quality and its 2" diameter size have limited its application and effectiveness. It is for this reason that the present invention achieves significant improvement over the deficiencies of prior art television screen magnification screen systems and is an extension to micro endoscopic technology, which helps solve the surgeon's needs for an enlarged, enhanced quality, depth of field image as viewed on the video monitor screen.

Although the preferred embodiments in this application and U.S. patent application Ser. No. 08/155,748, filed Nov. 23, 1993, now U.S. Pat. No. 5,400,177 are described in connection with medical imaging systems, applicability of the present invention may also be found in surveillance systems for gas and oil lines and sewers, which range in size from 6 inches to 36 inches, building structure inspection, interior of mechanical motor inspection, military and police heat sensor night vision, military and commercial ship underwater surveillance, smart bomb testing, outer space transmissions that are viewed on a video monitor, commercial television, any future high definition television systems, and other environments in which image magnification, depth of field and/or improved image clarity and contrast are important. Other areas of application will be readily apparent to skilled artisans.

Referring now to FIG. 1, a 19" video monitor 1, includes a video screen 2. A housing 5 is attached in front of the video screen 2, and contains the mounted depth of field prismatic screen 3. The screen 3 is assembled in a frame 3A. As described in application Ser. No. 08/155,748, now U.S. Pat. No. 5,400,177, the depth of field screen is a multi prismatic structure with a plurality of horizontal micro prisms which extend across the width of the inner surface of the depth of field screen 3. Particular reference is made to FIGS. 5–12, 25–36 and 39 of that patent and the accompanying written specification for a more detailed description of the depth of field screen.

In the preferred embodiment of the present invention, a magnifying lens 4 placed in the front portion 6 of the housing 5 provides stronger depth cue enhancement and magnifies the image for easier viewing. In relation to the 2" diameter micro image, the magnification does not exceed 2.0×. In relation to a full screen video image, the magnification does not exceed 1.25×. In accordance with the present invention, the prismatic screen 3 and the lens 4 are designed as a single optical system. Without the prismatic screen, the lens 4 would magnify the image as well as the raster scan lines, making the image unacceptable. The prismatic screen, as described in U.S. patent application Ser. No. 08/155,748, filed Nov. 23, 1993, now U.S. Pat. No. 5,400,177, without the lens 4, does not magnify the image 1.25× to 2.0×.

The housing 5 attaches the optical elements to the front of the video monitor. Preferably, the front and rear portions of the housing are sealed with front and rear tempered glass windows, respectively, which are treated with anti-reflection coatings. The lens 4 may be an acrylic plano convex lens which is designed to provide focus and convergence separation. The focal length of the lens 4 is relatively long, preferably about 30 inches, but advantageously may range from 10" to 40". The lens 4 is preferably mounted about 5 inches from the video screen.

The prismatic screen 3, described fully in U.S. patent application Ser. No. 08/155,748, filed Nov. 23, 1993, now U.S. Pat. No. 5,400,177, is placed between the lens 4 and the video screen to provide additional focus and convergence information, and to reduce the size of video raster lines by three times. The prismatic screen is preferably mounted near the video screen with the "rows" of prism lenses running parallel to the video scan lines. The interior portion of the housing is preferably blackened to separate the viewed image from ambient light and reflections, which also helps to strengthen depth cues. Preferably, the outside front portion of the housing includes a black frame which tilts the optical front window by approximately 50 degrees to 100 degrees toward the inside of the housing to help eliminate reflections of bright objects and ambient light that may be present in front of the glass window.

The manner in which viewers eyes perceive depth cues is described in U.S. patent application Ser. No. 08/155,748, filed Nov. 23, 1993, now U.S. Pat. No. 5,400,177 with particular reference to FIGS. 13 to 22. In the same application, the manner in which the prismatic screen reduces the raster of video scanning lines is described with reference to FIGS. 31 to 36B. In the present invention, the plano convex lens 4, when combined with the prismatic screen also serves as a depth cue enhancement lens. The screen 3 and the lens 4 are designed as a single optical system 3–4.

FIG. 2 illustrates how a plano convex lens magnifies a video image. A viewed object $O_1$ is magnified by the lens L to provide a magnified object image $O_2$. In the preferred embodiment, the eye viewing distance to the lens is variable and the focal length of the lens is preferably a relatively long focal length.

FIG. 3 illustrates how the long focal length lens is used in the present invention. In a preferred embodiment, the magnification of the video screen $S_1$, to the virtual image $S_2$, is accomplished with a 25 inch diameter lens having a focal length of 762 mm and placed at the distance of 126 mm from the video screen. Since the primary object in the design of the lens is to strengthen the depth cues in the video image, the magnification can be kept as low as about 1.25×, which is below the distortion range caused by image magnification.

FIG. 4 illustrates the manner in which depth cues are enhanced. When a light beam passes through a transparent structure of glass or plastic, depending on the refraction index and the thickness of the structure, the image will focus at a shorter distance. When the structure is a plano convex lens, the image will be focused at a shortened distance "a" at the center of the lens, where the lens is thicker. Light passing through the thinner peripheral portions of the lens will be focused at "b". By using BK7 glass, which has a refraction index of 1.5163, the effective length of the light beam is shortened by about ⅓ of the BK7 glass thickness, and less at the edge of the lens.

A planar image p at the location of the screen S1 is seen through the lens 4 as a slightly curved image S2. This added curvature separates focus and convergence distances perceived by the eye and enhances the depth cues present in the planar image. As shown in FIG. 4, a light beam a passing through the central portion of the lens 4 encounters a lens thickness $t_a$. On the other hand, the light beam b passes through a peripheral portion of the lens 4 having a reduced thickness $t_b$. The lens causes focus displacing (shifting) across the image of BK7 glass approximately $X=t_a/3-t_b/3$. The shifting "X" causes an inconsistent reading of the eye focus and convergence relative to the planar video image p.

The image shifting caused by the lens provides a similar effect to the prismatic screen as described in U.S. patent application Ser. No. 08/155,748, filed Nov. 23, 1993, now U.S. Pat. No. 5,400,177. The lens and the prismatic screen combined into a single optical system causes an increased focus and a convergence displacement, which cuts off the convergence ability of the eyes to indicate to the viewer that the video image is flat. This allows the brain to analyze the depth cues to be perceived as real depth.

FIG. 5A illustrates the arrangement in U.S. patent application Ser. No. 08/155,748, filed Nov. 23, 1993, now U.S. Pat. No. 5,400,177 of the prismatic screen PR, the video screen S1 and the virtual image S2. The virtual image S2, appears behind the video screen S1, shifted down by the angle alpha. This image shifting is also related to the tilt of the prismatic screen angle beta. A typical value for the angle beta would be approximately 60°.

FIG. 5B illustrates the optical system of FIG. 5A combined with the lens L into a single optical system. The resultant virtual image S2 is magnified, causing a stronger focus and convergence displacement, and therefore a stronger depth cue effect enhancement. In addition, as described in the parent application, particularly with reference to FIGS. 29 to 36b, the prismatic screen PR preferably includes three miniature prisms for each video scan line. As a result, each raster video scanning line is divided into three, thereby providing a significant reduction in visibility of raster video scanning lines.

FIG. 5C illustrates a design configuration similar to that shown in FIG. 5B, but the prismatic screen PR is curved from side-to-side along the horizontal axis. To accommodate the curved prismatic screen PR, the lens L is changed from spherical to non-spherical, and is designed to follow the curve of the prismatic screen. This arrangement corrects image distortions for an increased angle of viewing of the image.

FIG. 5D illustrates a side view of another configuration similar to the arrangement of FIG. 5B. As shown in FIG. 5D, the prismatic screen PR may be applied directly to the plano surface of the plano convex lens L by any known technique. For example, the micro prisms may be etched, rolled or milled with high precision directly in the surface of the lens 4. Alternatively, the prisms could be mechanically or chemically attached appropriately to the lens. S1 is the video image, S2 is the magnified video image.

Figure 5E:
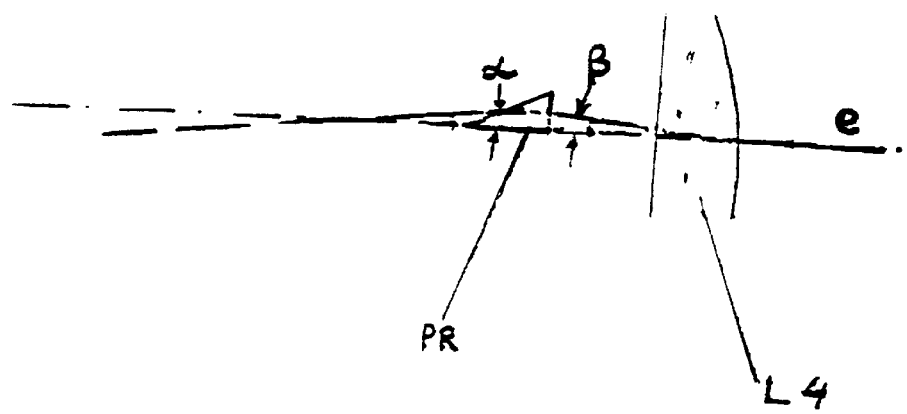
FIG. 5E is an illustration of an embodiment of the present invention with the light pass "e" passing the lens L4 and the single prism of the prismatic screen "PR"

FIG. 5E illustrates the light beam path being directed by the lens 4 and by a single prism section of the prismatic screen PR. The light beam from the lens 4 enters the prism on the angle beta, thereby modifying the prismatic screen's design angle alpha, according to the focal length and the refraction index of the lens 4.

Figure 5F:
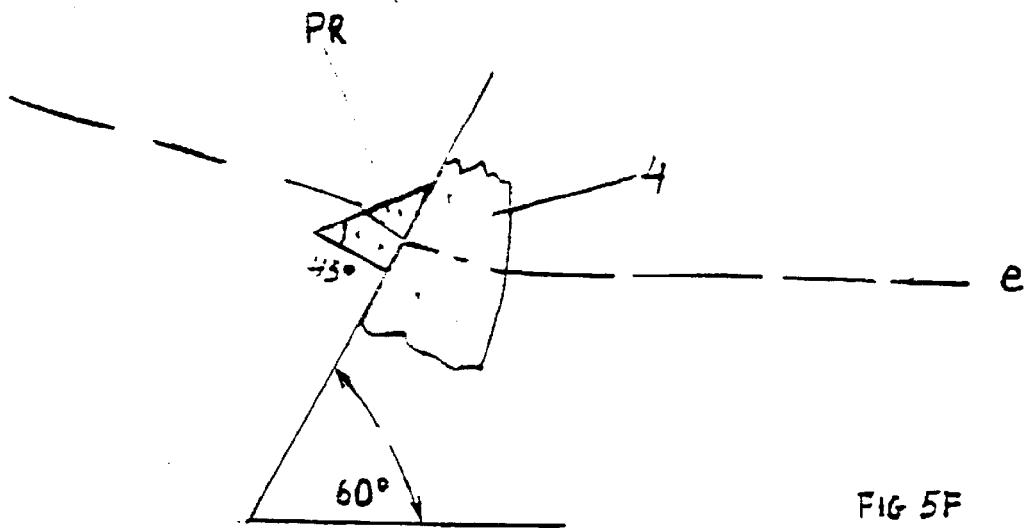
FIG. 5F is an illustration of an embodiment of the present invention wherein the light path "e" passes angled lens 4 and a single prism of a prismatic screen PR laminated to the lens.
Figure 5G:
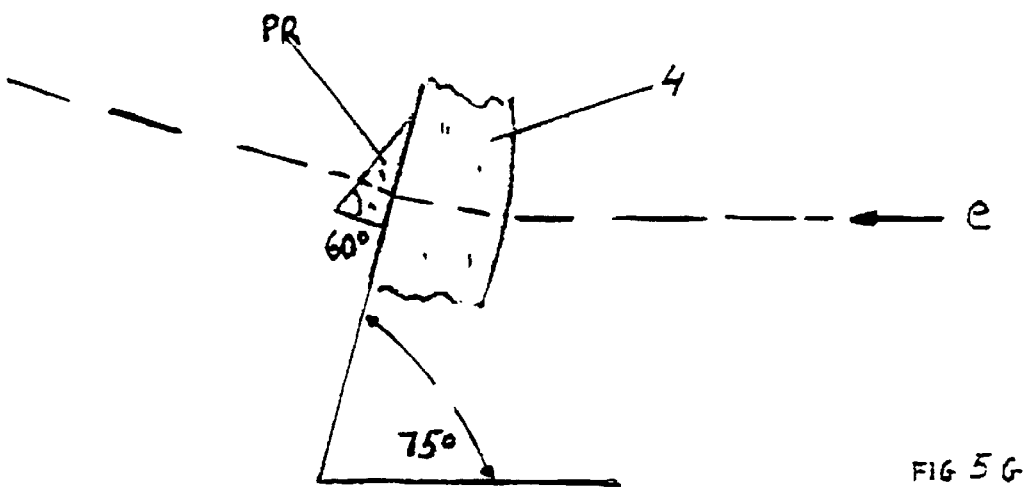
FIG. 5G is another illustration of an embodiment with a prismatic screen laminated to the lens 4, wherein the angles of the prism and the lens 4 have been changed from those of FIG. 5F.

FIG. 5F shows a section of lens 4 which is laminated, cemented, rolled, etched or milled directly to the prismatic screen PR. For clarity, only a section of the prismatic screen is illustrated. The prismatic screen has a prism angle of 45 degrees and the plano surface of the lens 4 is tilted 60 degrees from the viewing axis. FIG. 5G illustrates an alternative embodiment wherein the prismatic screen PR has a prism angle of 60 degrees and the plano surface of the lens is tilted 75 degrees from the viewing axis. Assuming a horizontal viewing axis, the lens 4 is preferably placed in a more upright position as the prism angle increases.

Figures 6A, 6B:
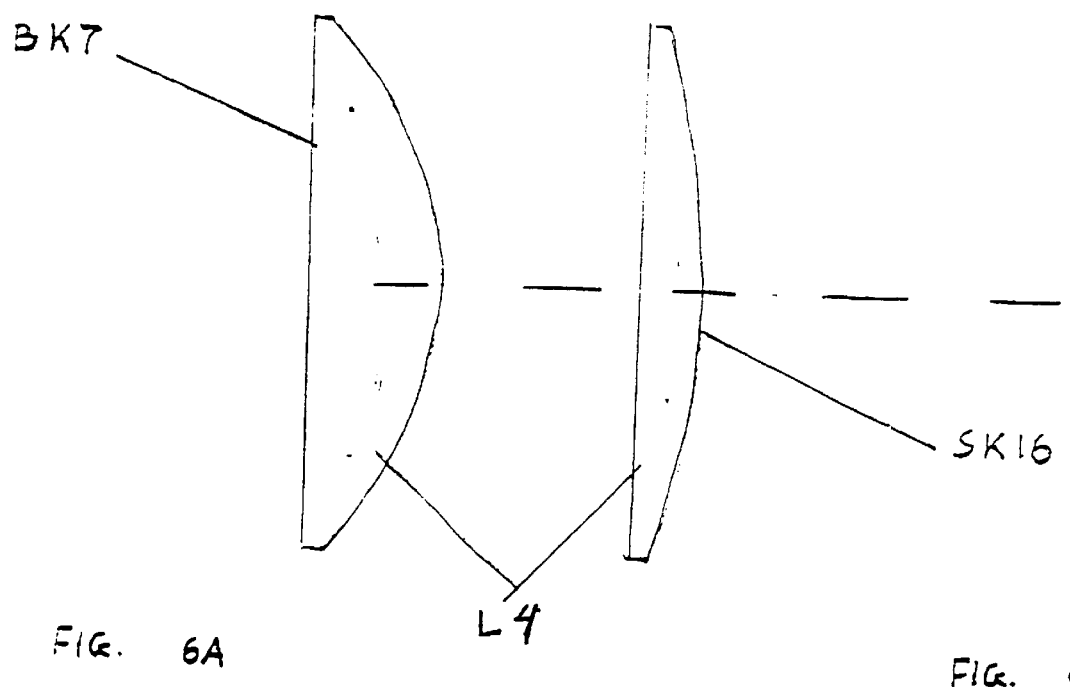
FIG. 6A is an illustration of an embodiment of the present invention with the lens 4 made in BK7 glass.
FIG. 6B is an illustration of another embodiment of the present invention with the lens 4 made with high refraction index SK16 glass.
Figure 7:
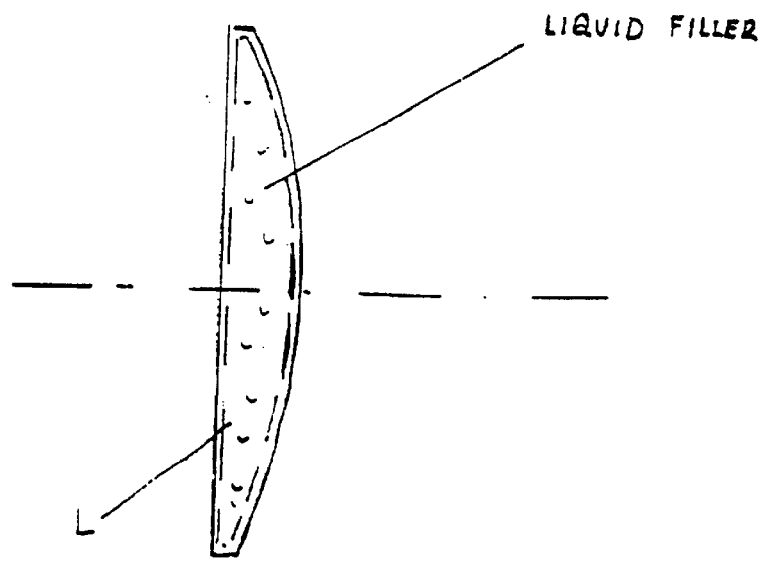
FIG. 7 is an illustration of yet another embodiment of the present invention with the lens 4 designed as a hollow optical structure which is filled with a liquid high refraction index filler.

FIGS. 6A, 6B and 7, show different designs of the lens 4. FIG. 6A illustrates the same lens 4 described in connection with the system of FIG. 5B. In FIG. 6B, the lens 4, instead of being made from BK7 glass (having a refraction index of 1.5163), is made with SK16 glass which has a higher refraction index of 1.6204. The lens also can be made from acrylic and polycarbonate plastic materials having a relatively high index of refraction. By using a material with a higher refraction index the center thickness (FIG. 6B) and therefore the weight of the lens can be reduced.

FIG. 7 illustrates a design of a hollow plano convex lens which is similar to the lens in FIG. 5B. The lens is manufactured as an empty, molded, cut and polished element which is then filled with a high refractive index liquid and sealed. Even with difficulties in sealing the edges to prevent leaking of the high index liquid, this design is still cost efficient and reduces the weight of the entire system.

Referring now to FIG. 8, when magnification of the video image is not desired or needed, the lens 4 may be replaced with an optically flat plate F having a thickness, for example, of 1 inch. The thick plate operates in a manner similar to the lens 4 by shortening the length of the light beam passing through the transparent plate by approximately ⅓ of the glass thickness; $X=D_1-D_2$. As illustrated in FIG. 8A, the virtual image S2 appears in front of the video screen S1. As with the systems utilizing the plano convex lens, the system of FIG. 8A causes a focus and convergence displacement which enhances the depth cues of the viewed image.

Figure 10:
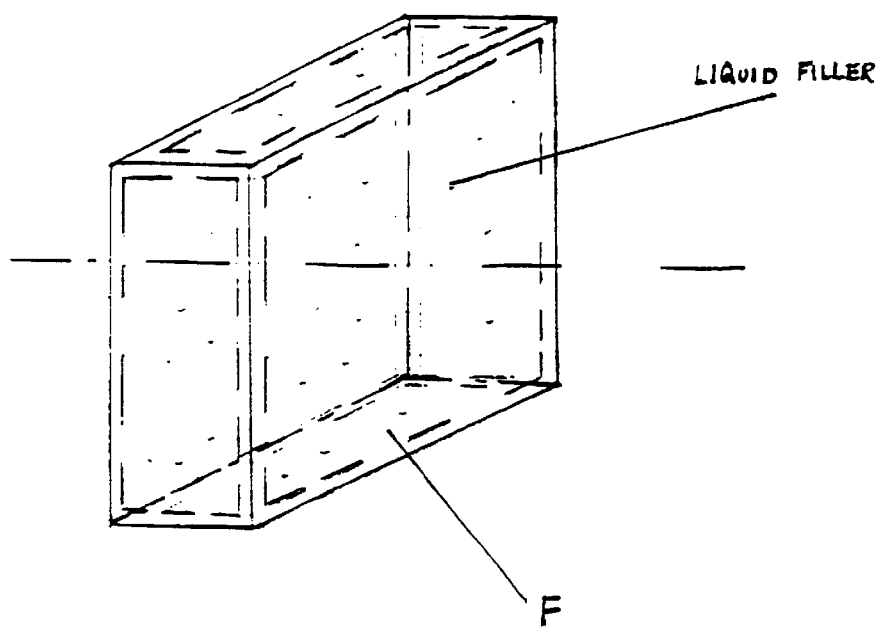
FIG. 10 is an illustration of the present invention with the parallel transparent plate which is hollow and is filled with a liquid high refraction index filler.

FIGS. 9 and 9A illustrate the plate from FIG. 8 with the prismatic screen surface PR, applied to the flat surface of the transparent plate F. FIG. 10 shows the optically flat plate replaced by a hollow molded or cut plate that is filled with a high refraction index liquid and sealed.

Use of an aspherical lens in the present invention to diminish or remove distortion will now be described in relation to FIGS. 11 through 19.

Figure 11:
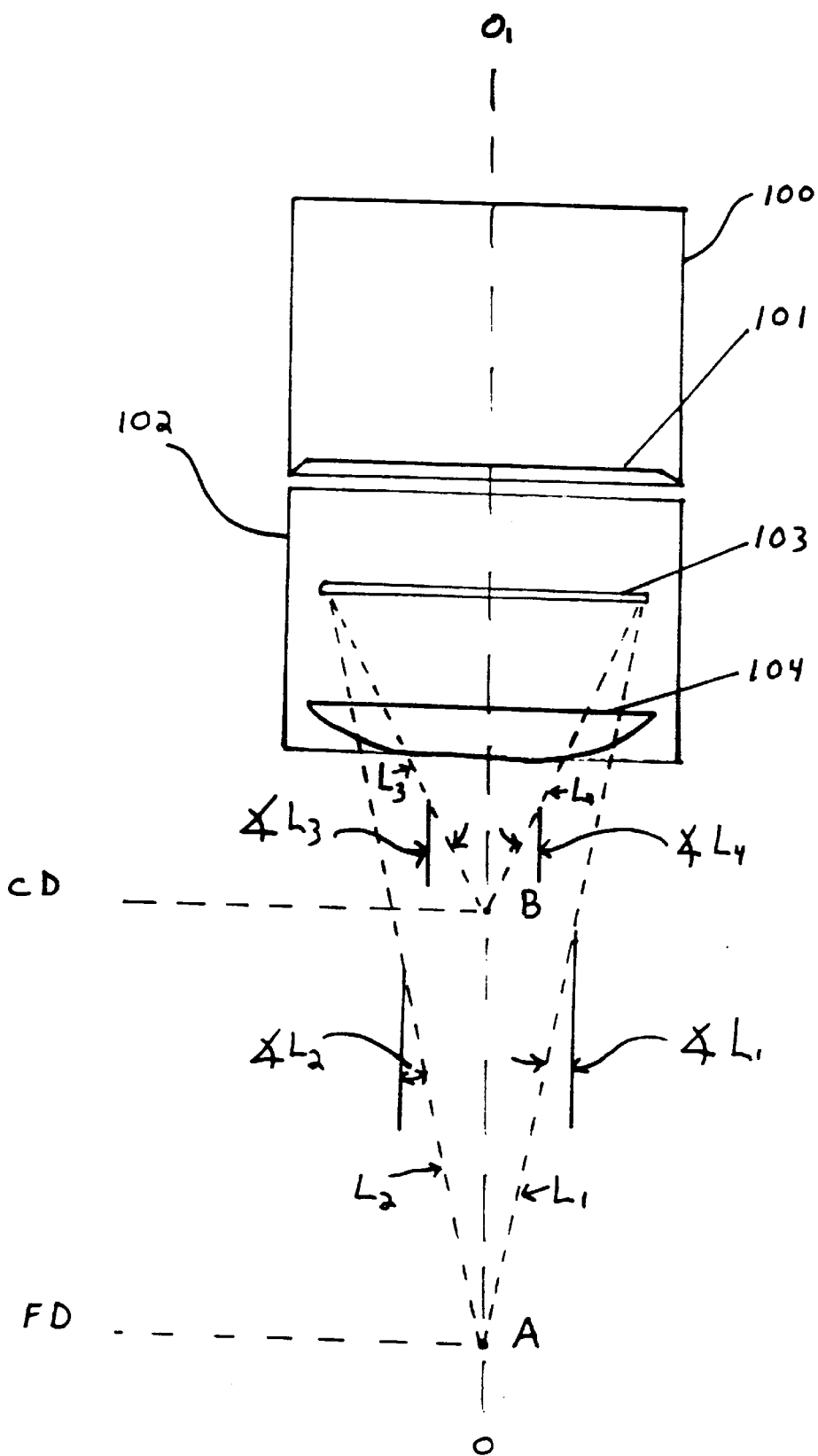
FIG. 11 is an illustration of two viewing points along the center axis of a video monitor with a depth of field prismatic screen and a spherical magnifying lens attached thereto.

FIG. 11 illustrates a top view of one embodiment of the depth of field viewing apparatus of the present invention, comprising video monitor 100, video monitor screen 101, prismatic screen housing 102, prismatic screen 103 and spherical magnifying lens 104. FIG. 1 also illustrates two separate viewing points, A and B, along the center axis O-O1 of the device. Viewing point A is at a distance FD from spherical magnifying lens 104. Viewing point B is at a distance CD from lens 104.

A viewer at viewing point A would see light beams along paths L1 and L2 exiting the spherical magnifying lens 104 at angles <L1 and <L2, respectively. A viewer at viewing point B would see light beams along paths L3 and L4 exiting the spherical magnifying lens 104 at angles <L3 and <L4, respectively. Because the lens is spherical and these viewing points are on the center axis of the device, the angles created by light beam paths L1 and L2 are equal. Similarly, the angles created by light beam paths L3 and L4 are equal. Thus, the magnification of those light beams along those paths by the spherical magnifying lens is equal and the viewer sees little or no image distortion due to the lens.

Figure 12:
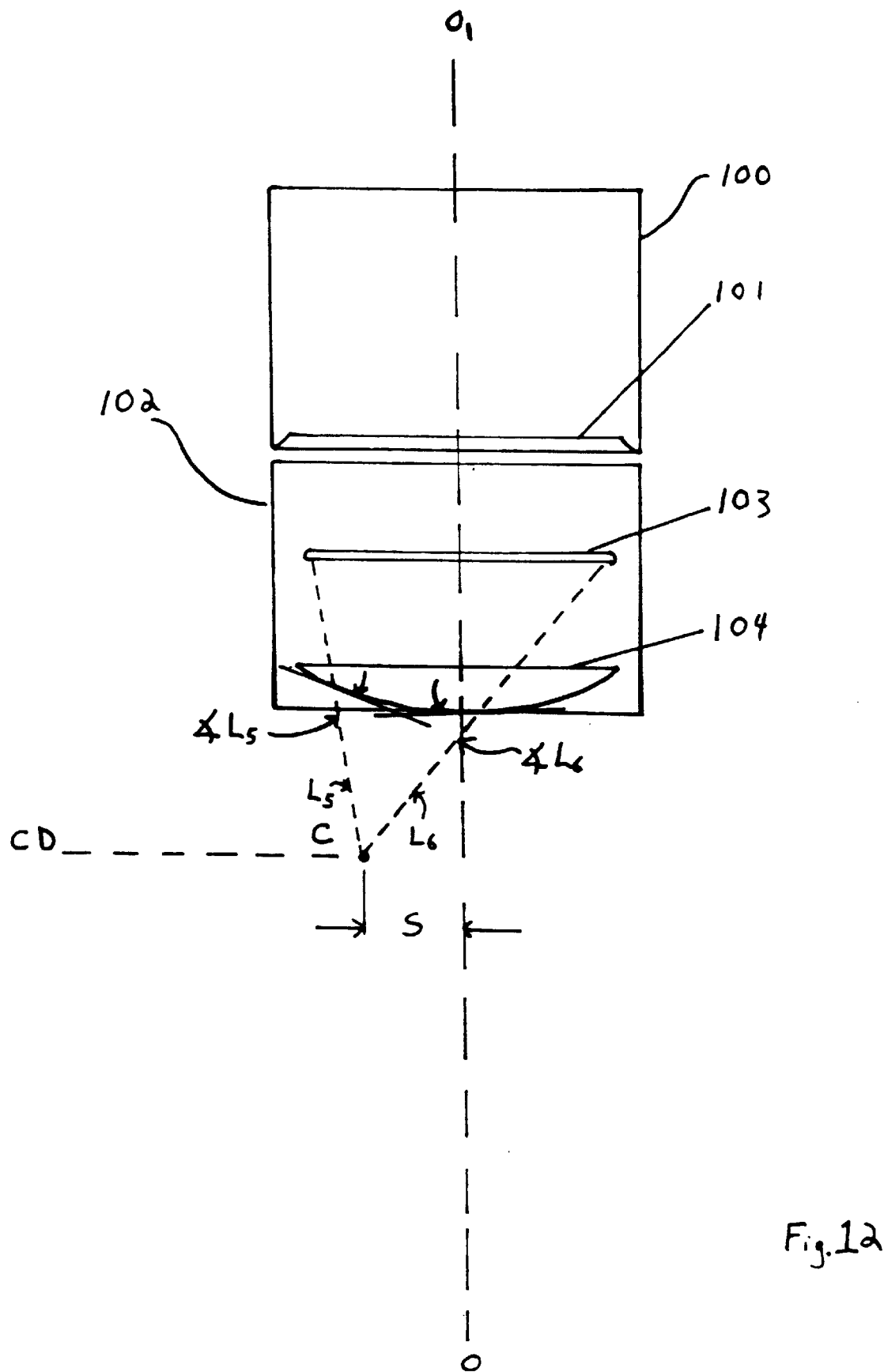
FIG. 12 is an illustration of a viewing point shifted to one side of the center axis of a video monitor with a depth of field prismatic screen and a spherical magnifying lens attached thereto.

FIG. 12 illustrates the device of FIG. 11, again having video monitor 100, video monitor screen 101, prismatic screen housing 102, prismatic screen 103 and spherical magnifying lens 104. FIG. 12, however, shows viewing point C at a distance CD from the magnifying lens 104 and shifted a distance S to the left of center axis O–O1. A viewer at point C sees light beams exiting the spherical lens 104 along paths L5 and L6 and creating angles <L5 and <L6, respectively. Unlike light viewed at points A and B as described with respect to FIG. 11, angles <L5 and <L6 are not equal. The magnification of light along paths L5 and L6 is therefore different and may cause significant image distortion.

Figure 13:
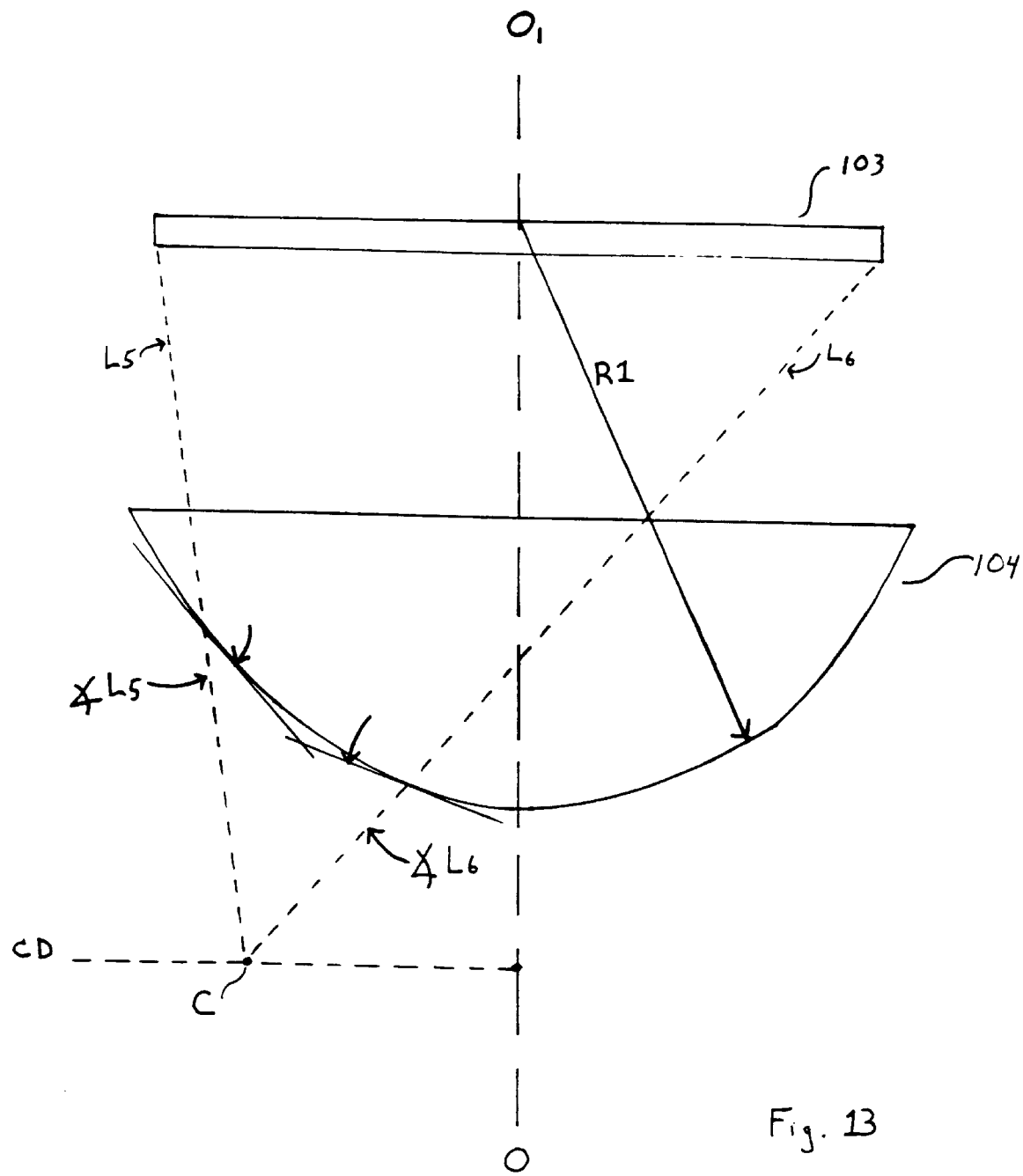
FIG. 13 is an illustration of a viewing point shifted to one side of the center axis of a depth of field prismatic screen and an adjacent spherical magnifying lens.

FIG. 13 is a more detailed view of the spherical magnifying lens 104 and prismatic screen 103 of FIGS. 11 and 12. There it can be seen that the curvature of the lens 104 is defined by the radius R1 of that lens and determines the angles <L5 and <L6 associated with light viewed by the viewer at viewing point C. As described above, where <L5 and <L6 are different, the image seen by a viewer at point C may be distorted.

Figure 14:
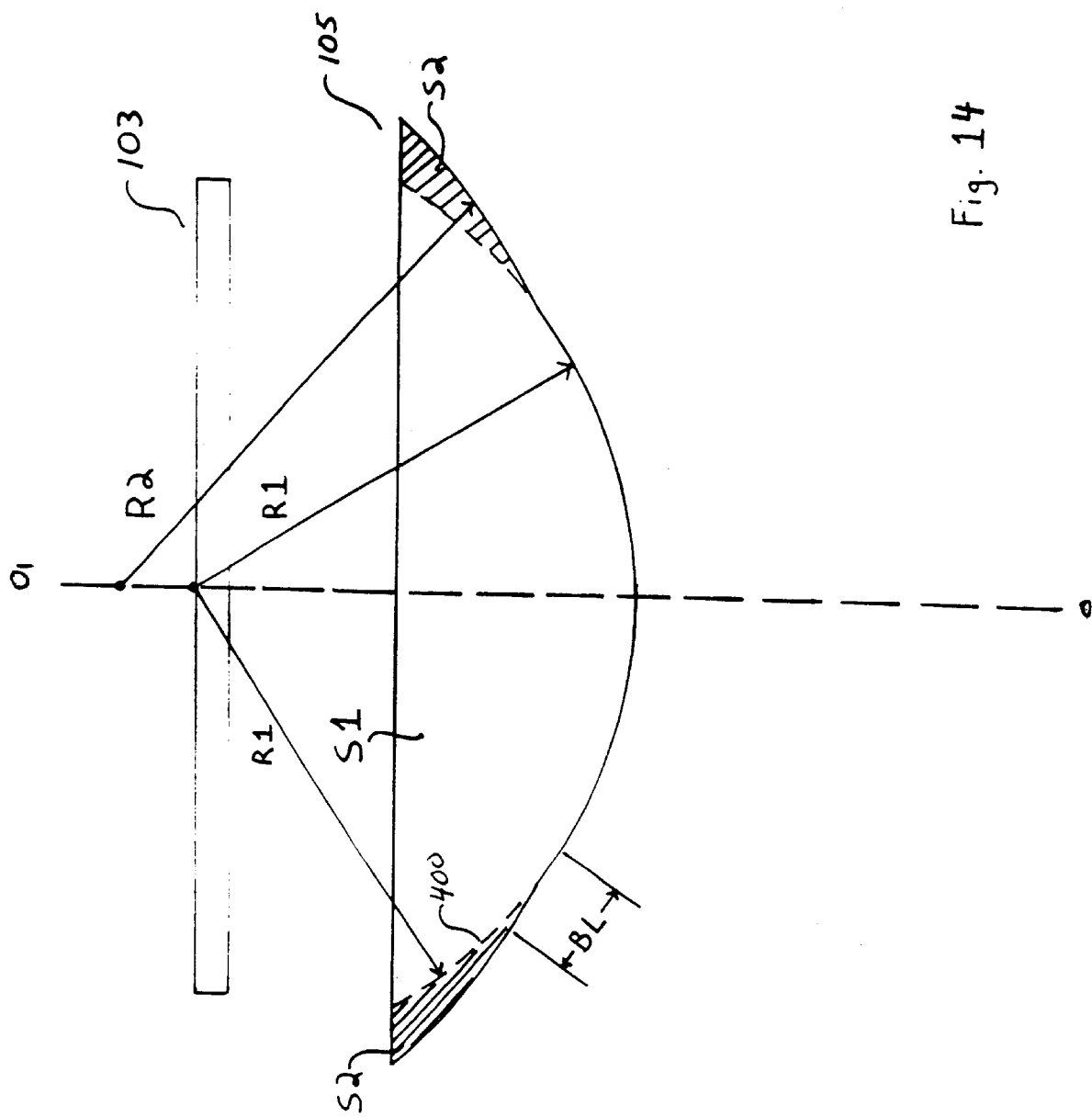
FIG. 14 is an illustration of a depth of field prismatic screen and an adjacent aspherical magnifying lens.

An advantageous way to avoid or minimize this problem is to replace the spherical magnifying lens 104 of FIGS. 11 through 13 with an aspherical lens defined by multiple radii. FIG. 14 illustrates such an aspherical lens 105 along with prismatic screen 103 and having center axis O–O1. In one embodiment, aspherical lens 105 magnifies the image created by the screen 1 to 2 times without distortion.

Aspherical lens 105 is made up of center section S1 and side section S2. The curvature of the lens along the center section S1 is defined by radius R1, which is the same radius that defines spherical magnifying lens 104 in FIGS. 11 through 13. The curvature of the lens along the side section S2 is defined by radius R2, which most advantageously is 10 to 50 percent greater than radius R1 (as indicated by dotted line 400, which depicts what the curvature of a spherical lens defined by radius R1 would be in section S2).

Over a portion of the lens, denoted as BL in FIG. 14, the radius of the curvature of the lens will be transitioning, or blending, from R1 to R2. This blending will take place over only a small portion of the lens, and is defined by a succession of, for example, three or four radii of increasing magnitudes between R1 and R2. Thus, the actual radius of curvature at any given point in portion BL will be between R1 and R2 and will change over a small portion of the lens. The aspherical lens 105 is described as being defined by only two principal radii (R1 and R2) for purposes of clarity of description so that the invention is not obscured. However, the present invention is not limited to an aspherical lens with only two principal radii. The invention could be practiced with a lens having more than two such radii, though at a greater cost and complexity of manufacture.

Figure 15:
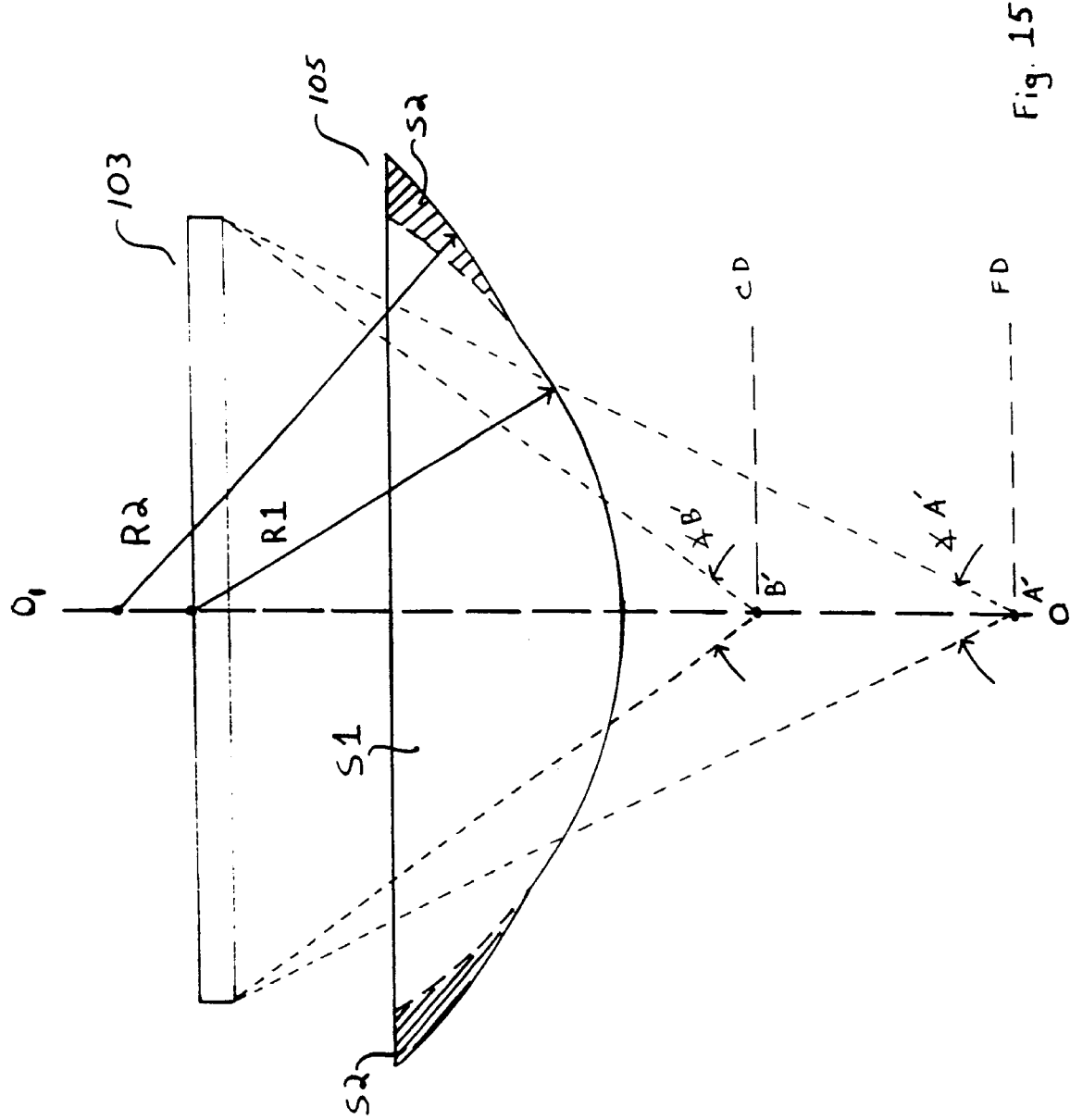
FIG. 15 is an illustration of two viewing points along the center axis of a depth of field prismatic screen and an aspherical magnifying lens.

Referring now to FIG. 15, aspherical lens 105 and prismatic screen 103, long with center axis O–O1 are shown. Here, viewing points A' and B' are shown at distances FD and CD from the lens, respectively. In one embodiment, the far distance (FD) center axis viewing point is 9 feet and the close distance (CD) center axis viewing point is 3 feet. By this it is meant that the dimensions of the lens are chosen such that a viewer a distance FD from the lens can clearly view the image solely through portion S1 of lens 105, as can a viewer at distance CD from the lens. Determining exactly what lens dimensions are necessary to achieve this will depend on the characteristics of the specific device being used, such as diameter and magnification of lens, and is well within the competence of the ordinarily skilled artisan. As can be seen from the Figure, viewing angle <A' at point A' and viewing angle <B' at point B' are such that the image on the screen is viewed substantially through the center section S1 of the lens, defined by radius R1. Thus, little or no image distortion is perceived by the viewer.

Referring now to FIG. 16, aspherical lens 105 and prismatic screen 103, along with center axis O–O1 are shown. Here, however, viewing point C', which is at distance CD from the lens 105 and shifted a distance S to the left of center axis O–O1, is depicted. As shown, light beams along path L6 pass through center section S1, defined by radius R1, of the lens and form angle <L6 upon exiting. Light beams along path L5, however, pass through side section S2, defined by radius R2, and form angle <L5 upon exiting.

As can be seen by shaded area X, the angle <L5 formed by using the aspherical lens is less than that angle would have been had a spherical lens defined only by radius R1 been used. Thus, the differences between angles <L5 and <L6 are diminished as are the differences between the magnifications of light along paths L5 and L6 thereby minimizing or removing image distortion caused by varying magnifications.

Figure 17A:
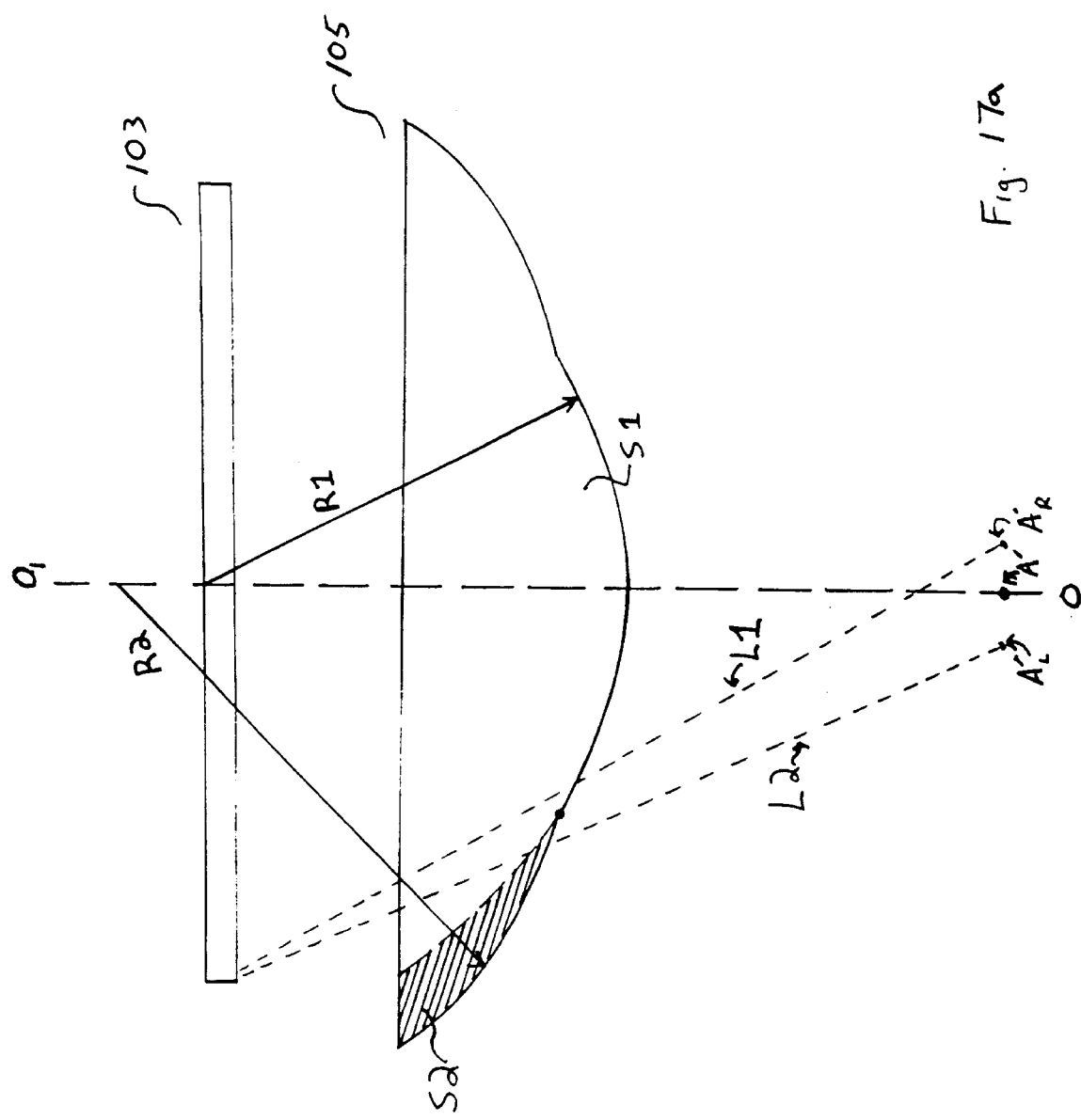
FIG. 17a is an illustration of an exemplary aspherical lens designed to account for the interocular distance between the eyes of a viewer.

FIG. 17 illustrates the aspherical lens 105, screen 103 and center axis O–O1. FIG. 17 also illustrates interocular distance O.D. at points A', B' and C'. That is, when designing an aspherical lens to be used with the present invention, one must take into account the interocular distance between the eyes of the viewer when choosing the dimensions of the lens so that the image being viewed is not seen through one section of the lens (e.g., S1) by one eye and through another section of the lens (e.g., S2) by the other eye, thereby causing distortion of the image. Such a situation is shown in FIG. 17a with respect to viewing point A'. There, the light along path L1 passes through portion S1 of lens 105 and is seen by the viewer's right eye at point $A_R$'. The light along path L2 passes through portion S2 of lens 105 and is seen by the viewer's left eye at point $A_L$'. This may cause the viewer to perceive a distorted image. In order to avoid this situation, the two-point eye viewing distance should be 20% of the lens diameter.

FIG. 18 illustrates another advantage of the use of an aspherical lens in the apparatus of the present invention. FIG. 18 again shows aspherical lens 105 and prismatic screen 103, along with center axis O–O1. Had a spherical lens, defined solely by radius R1, been used, the lens would have been of diameter D and thickness LSC1. An aspherical lens, defined by radii R1 and R2 where R2 is greater than R1, has a diameter of D', even though only diameter D is necessary. This permits use of lens of lesser thickness. That is, an aspherical lens defined by radii R1 and R2 where R2 is greater than R1 need only be of thickness LSC2 to achieve diameter D. This center thickness reduction results in a lens weight reduction, making the device more convenient.

Figure 19:
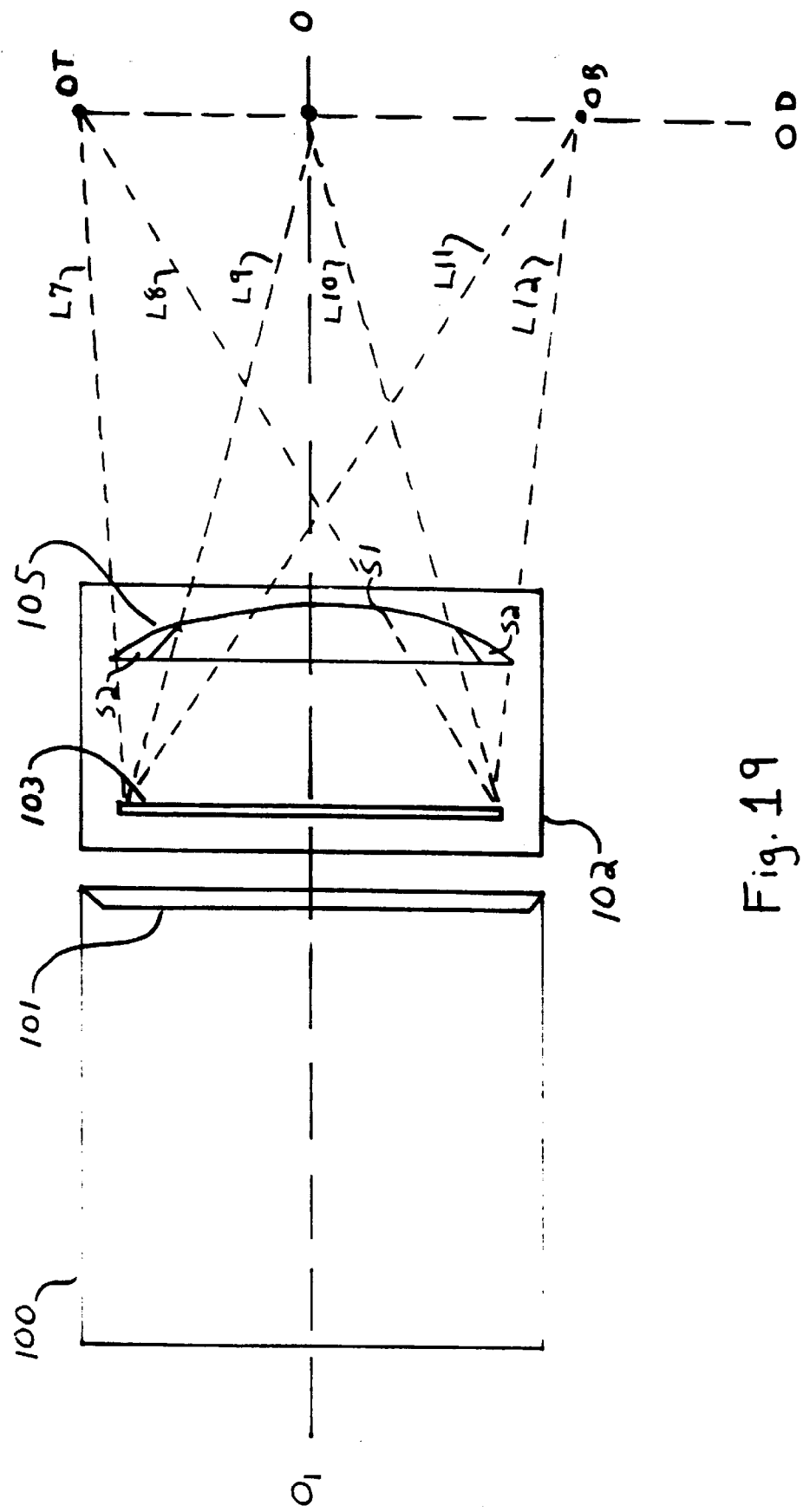
FIG. 19 is an illustration of three viewing points, one along, one above and one below the center axis of a depth of field prismatic screen and an aspherical magnifying lens.

FIG. 19 illustrates a side view of the apparatus of the present invention using the aspherical lens 105 and comprising video monitor 100, video monitor screen 101, prismatic screen housing 102, prismatic screen 103 and aspherical lens 105. FIG. 19 also illustrates center axis O–O1 and three viewing points, O, OT and OB, each a distance OD from the lens. Viewing point O is on the center axis O–O1, while point OT is above the center axis and point OB is below it.

Similar to the situation described above where the viewing point is displaced horizontally from the center axis of the device, FIG. 19 illustrates how use of an aspherical lens in the present invention can minimize or remove image distortion when the viewing point is displaced vertically from the center axis. Specifically, light beams along path L7 and L8 will pass through different sections (S1 and S2, respectively) of aspherical lens 105, just as light beams along paths L11 and L12 will pass through different sections (S1 and S2, respectively) of lens 105. Just as described above, use of an aspherical lens defined by multiple radii will minimize or remove image distortion for viewers at point OT and OB. FIG. 19 also illustrates how light beams along paths L9 and L10 will pass through the same, center section, S1, of lens 105, thus not experiencing distortion.

Figure 20:
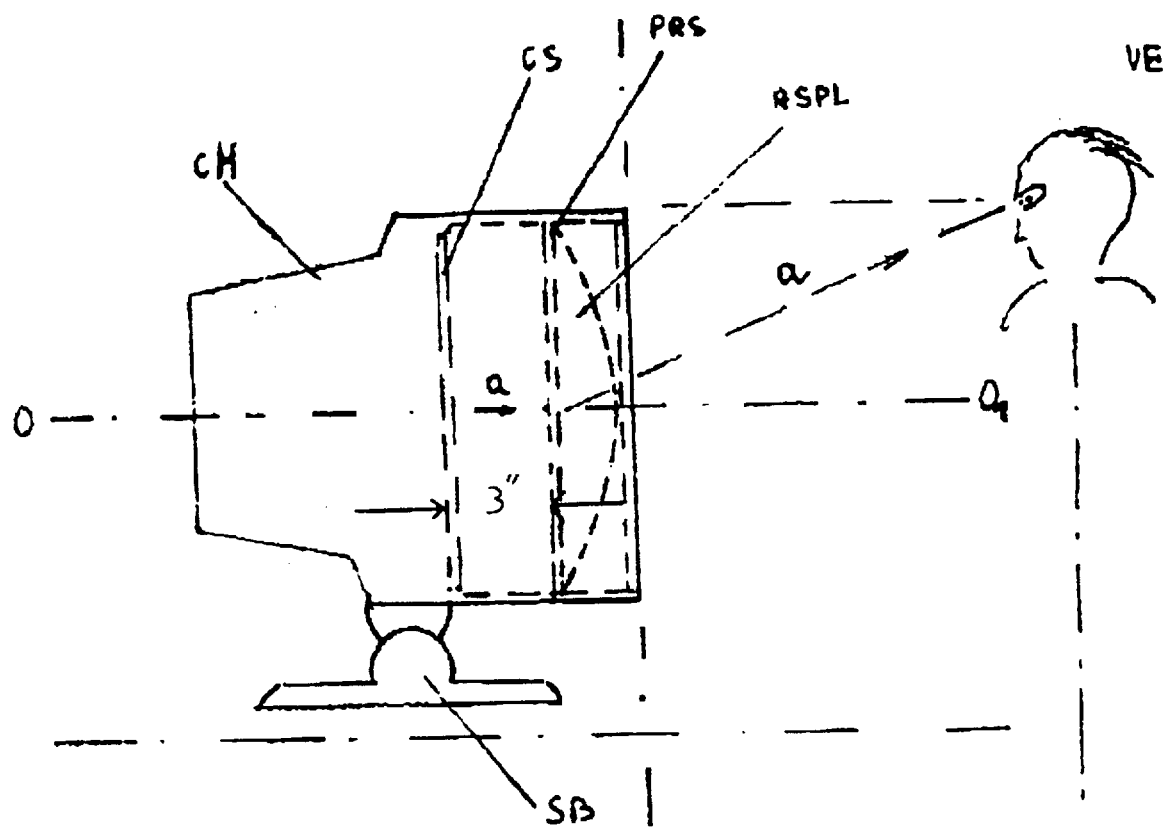
FIG. 20 shows one example of the prismatic screen of the present invention used in the context of a computer monitor.

FIG. 20 shows one example of how the present invention can be used in the context of a computer monitor. The system is used most advantageously by disposing the prismatic screen and lens at close distance from the computer screen by keeping the optical housing dimensions as small as possible and extending the housing from the front of the computer monitor screen at a small distance. For example, FIG. 20 shows a conventional CRT display combined with aspherical lens ASPL, which is similar to lens 105 described above, and prismatic screen PRS. In this example, the lens and screen are placed at a distance of 3 inches in front of the computer screen CS, though distances as great at 12 inches, and perhaps more, could be utilized. Computer screen CS is housed in computer housing CH, which also houses the CRT and associated circuitry (not shown) of the conventional computer display. Such circuitry is well known in the art and will not be further described here.

In the example shown in FIG. 20, image a is generated by the CRT within housing CH in a conventional manner and is transmitted along axis $O-O_1$. The image can be seen from many different viewing points, including the point designated VE shown positioned above the top edge of the computer's screen and inclined at an angle of 30 degrees. Note that different viewing angles are possible by tilting the computer on its base SB. In the example shown, prismatic screen PRS and aspherical lens ASPL compensate for the looking down viewing angle in the manner described above with respect to FIG. 19.

Figure 21:
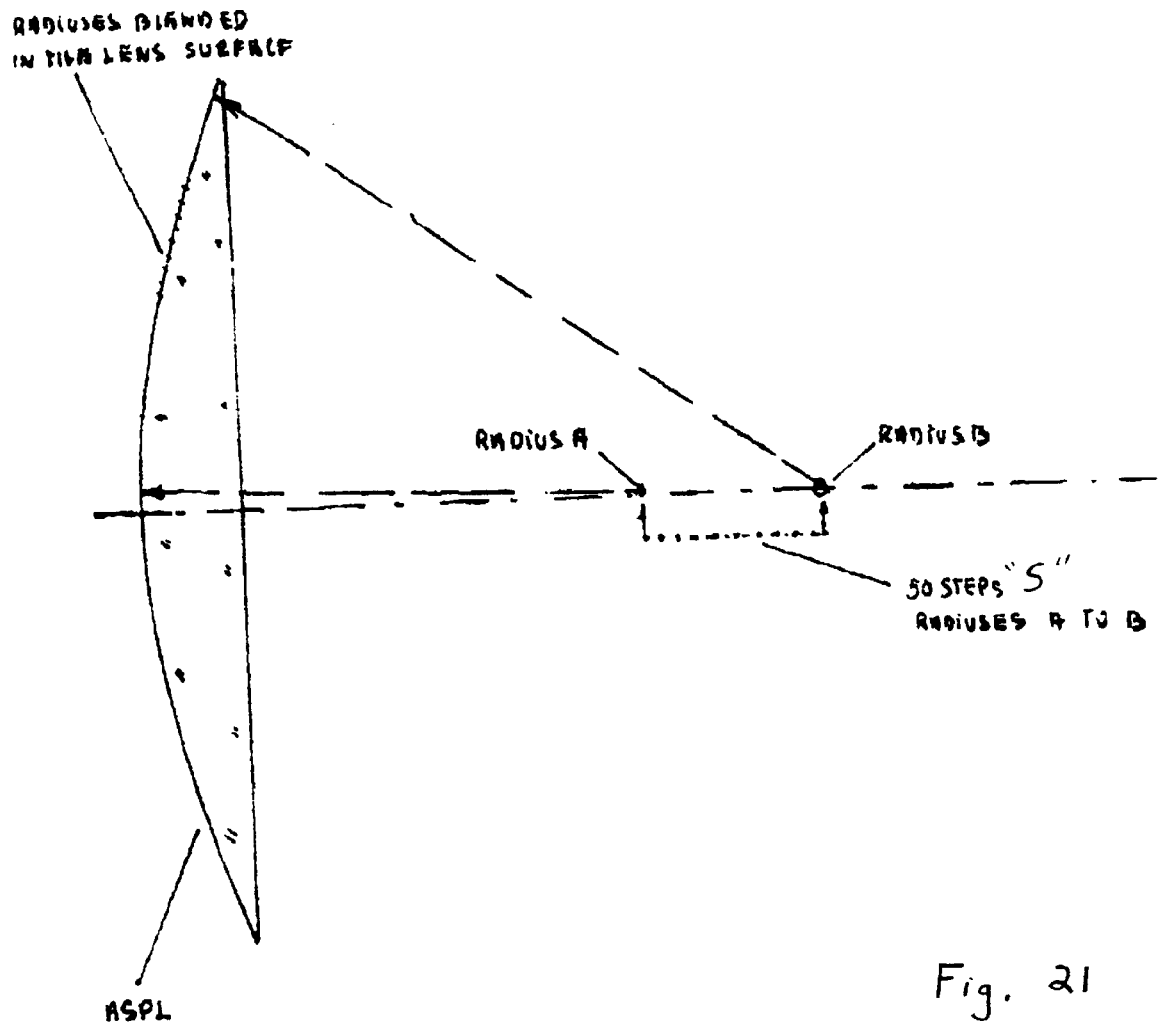
FIG. 21 shows an aspherical lens having defined therein 50 or more radii that blend one into the other.

FIG. 21 shows an aspherical lens ASPL constructed of 50 or more radii that blend one into the other, as described above. The radius "A" changes into radius "B" from the center of the lens to its edge, with each intermediate radius being measured from a different one of the steps S shown. When the invention is used in the computer monitor context, radius "B" is advantageously chosen to be approximately 10% to 40% longer than radius "A" due to the desire to make the system as compact and lightweight as possible.

Figure 22:
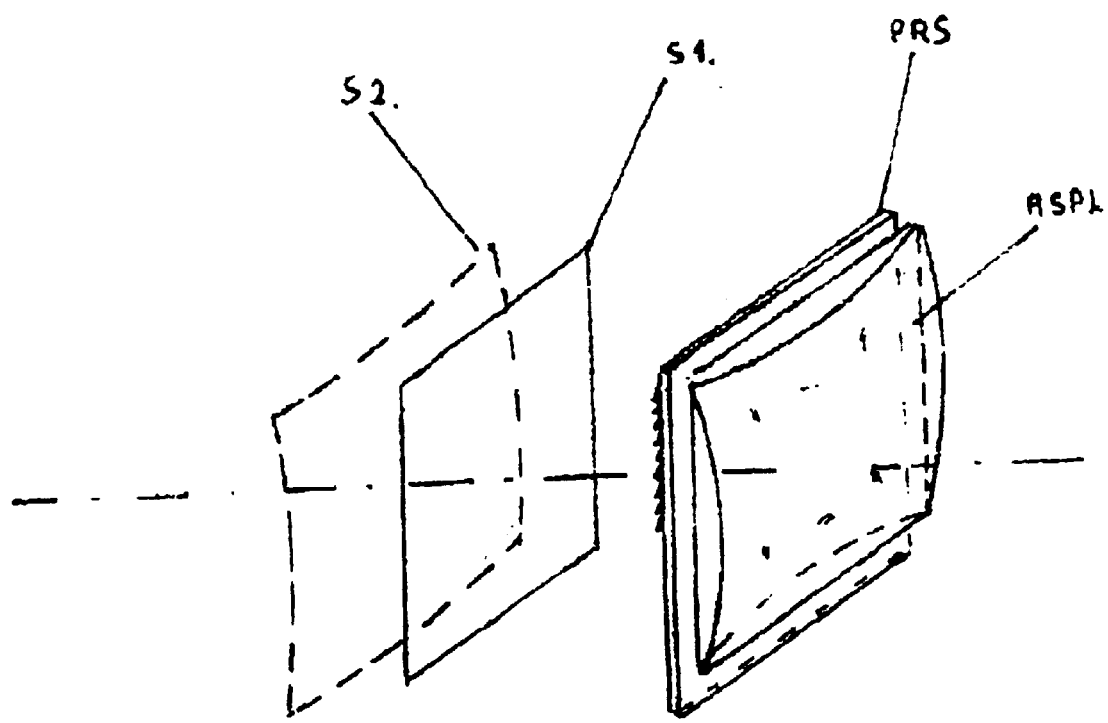
FIG. 22 shows an aspherical lens magnifying a computer image.

FIG. 22 shows the aspherical lens ASPL magnifying computer image S1 so that it appears as virtual curved image S2. Curving the image S1 into S2 separates the images focus from convergence. Combined with the effects of the prismatic screen PRS, described above, this allows a viewer to perceive computer image depth cues with much greater clarity. The aspherical lens in this example is designed to magnify the computer image 25% or more with no distortion. The prismatic screen PRS reduces the scanning lines, or the pixel elements of the computer image, and enhances the resolution of the image, which helps to eliminate eyestrain. Thus, images are not only magnified but contain more detail.

Figure 23:
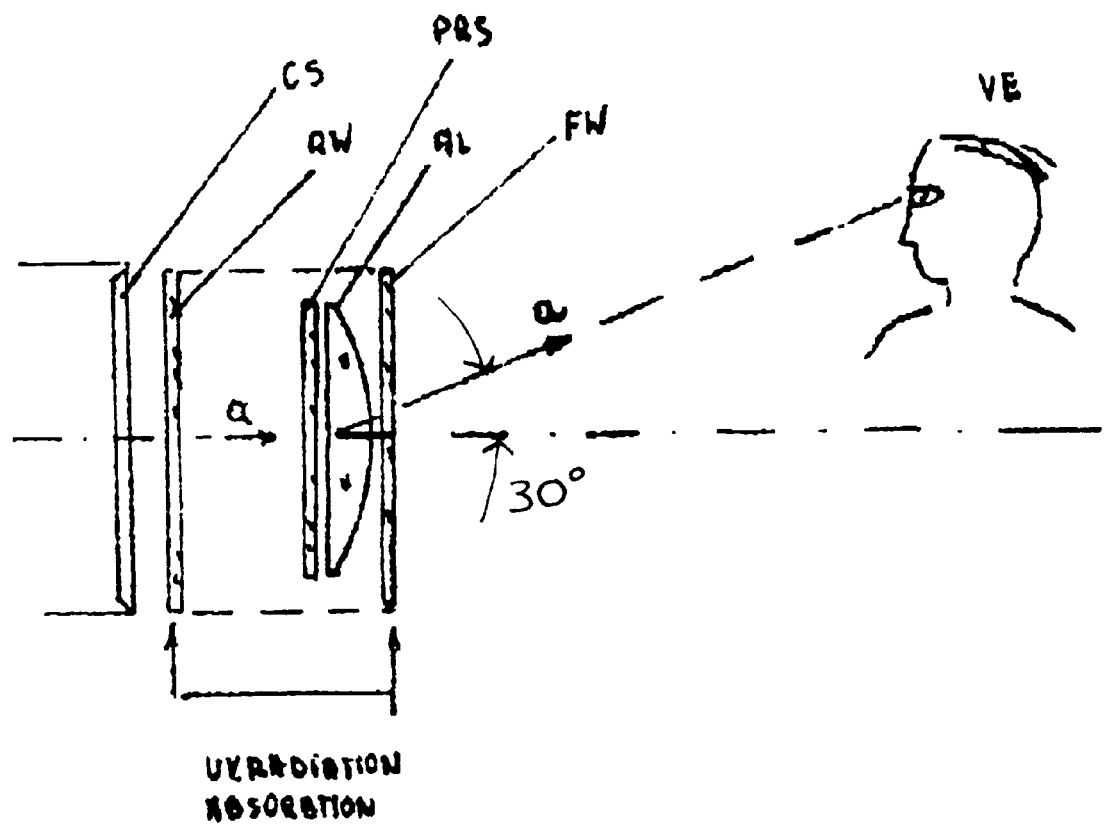
FIG. 23 shows the prismatic screen and aspherical lens placed in front of a computer monitor screen.

FIG. 23 shows the prismatic screen and aspherical lens placed in front of the computer's monitor screen. It has been discovered that these elements work as a UV shield, stopping UV radiation which is harmful for the viewers eyes. This shield also contributes to the elimination of eyestrain. The light beam OL from the computer's screen CS, passing through the rear window RW, the prismatic screen PRS, the aspherical lens AL and the front window FW and is UV radiation free, before reaching the viewers eyes.

Figure 24:
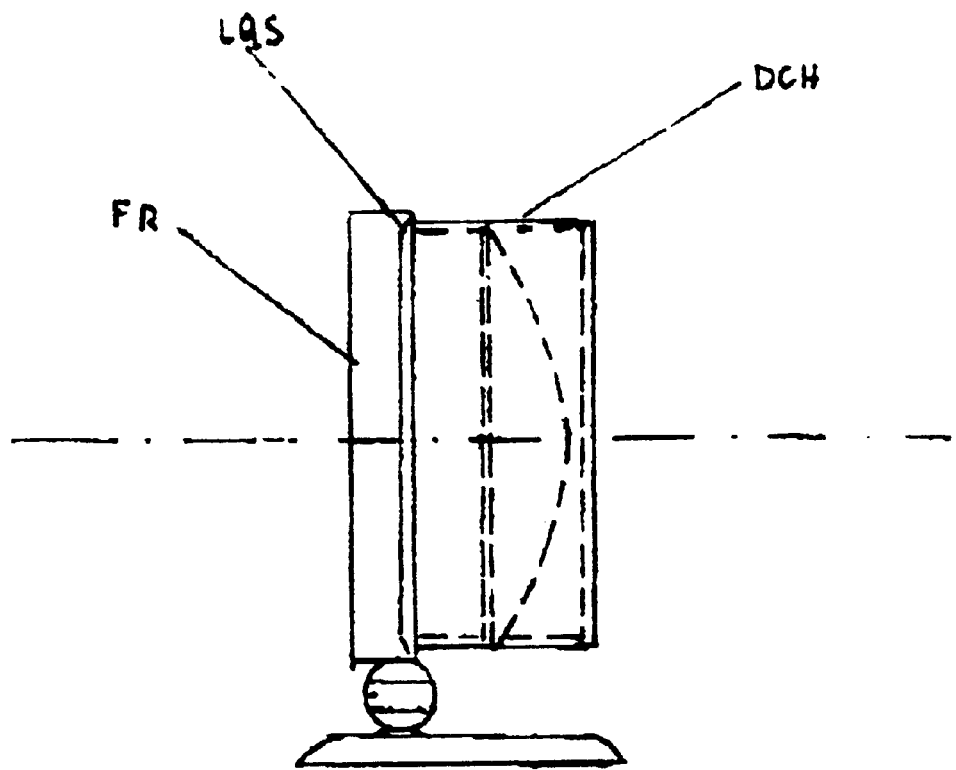
FIG. 24 shows a computer monitor screen framed with a liquid crystal screen.

The system of the present invention can be used in conjunction with all types of computer monitor, including digital high definition and flat liquid crystal models. FIG. 24, for example, shows the liquid crystal screen LQS, framed in the flat computer screen housing FR, without the rear cone shaped tube, which is typical for regular computer screens. The computer housing DCH attached to the liquid crystal screen LQS is designed to be narrow and to fit the flat liquid crystal screen. The liquid crystal computer screen is characterized with better contrast of the image and better image resolution. The computer screen system of the present invention raises the liquid crystal image to a higher quality level, where the image appears in depth, is magnified and has higher image resolution.

The principles, preferred embodiments and modes of operation of the present invention have been described in the foregoing specification. The invention that is sought to be protected herein, however, is not to be considered as limited to the particular forms disclosed, since these are to be regarded as illustrative rather than restrictive. Variations and changes may be made by those skilled in the art without departing from the spirit and scope of the invention. For example, the present invention is not limited to viewing of a video screen image, but may be used in viewing any image that includes recorded depth cues. Such images include computer images, high definition television images, projected film images, still photographs and slides, transparencies, printed images and works of art. Nor is the invention limited to the specific aspherical lens described. As noted above, lenses with multiple radii may be used while remaining well within the scope and spirit of the invention.

What is claimed is:

1. An apparatus for enhancing the quality of a video image, comprising:
    a video monitor
    a prismatic screen coupled to said video monitor; and
    a lens adjacent to said screen, said lens being curved across its width and comprising a plurality of sections each having a different radius of curvature
    wherein said aspherical lens means comprises more than two radii.

2. The apparatus of claim 1 having a far distance center axis point of viewing of approximately nine feet.

3. The apparatus of claim 1 having a close distance center axis point of viewing of approximately three feet.

4. The apparatus of claim 1, wherein said video monitor includes a liquid crystal display.

5. The apparatus of claim 1, wherein said lens has a magnification power of approximately 1.25 to 2 times.

6. The apparatus of claim 1, wherein a first radius of said lens is 10 to 50 percent greater than a second radius of said lens.

7. The apparatus of claim 1, wherein a first radius of said lens blends into a second radius of said lens.

8. An apparatus for improving the depth cues in an image, comprising:

prismatic screen means for enhancing image quality; and aspherical lens means for minimizing image distortion caused by varying magnifications and for magnifying an image by passing said image through at least three portions of said lens means, each of said portions having a different radius of curvature.

9. The apparatus of claim 8 having a far distance center axis point of viewing of approximately nine feet.

10. The apparatus of claim 8 having a close distance center axis point of viewing of approximately three feet.

11. The apparatus of claim 8, further comprising:

video monitoring means for viewing the image.

12. The apparatus of claim 11, wherein said video monitoring means includes a liquid crystal display.

13. The apparatus of claim 8, wherein said aspherical lens means has a magnification power of approximately 1.25 to 2 times.

14. The apparatus of claim 8, wherein a first radius of said aspherical lens means is 10 to 50 percent greater than a second radius of said aspherical lens means.

15. The apparatus of claim 8, wherein a first radius of said aspherical lens means blends into a second radius of said aspherical lens means.

16. A method of improving image quality of a generated image, said method comprising the steps of:

generating an image;

passing the image through a transparent screen, the transparent screen having a plurality of optical elements formed therein; and passing the image through an aspherical lens, the aspherical lens having a curvature defined by at least a first, and second and third radius.

17. The method according to claim 16, wherein in said passing the image through an aspherical lens step, the aspherical lens has a magnification power of approximately 1.25 to 2 times.

18. The method according to claim 16, wherein in said passing the image through an aspherical lens step, the first radius of the aspherical lens is 10 to 50 percent greater than the second radius of the aspherical lens.

19. An apparatus for depth of field viewing of an image comprising:

a monitor a light modifying screen coupled to said monitor; and a lens adjacent to said screen, said lens being curved across its width and comprising a plurality of sections each having a different radius of curvature, wherein said lens is characterized by at least three radii.

20. The apparatus of claim 19 wherein depth cues in said image are enhanced by viewing said image through said apparatus.

21. The apparatus of claim 20 in which said lens includes means for altering an image.

22. The apparatus of claim 21 wherein said means for altering includes a plurality of optical elements.

23. The apparatus of claim 19 in which said lens includes means for altering an image.

24. The apparatus of claim 23, wherein said means for altering includes a plurality of optical elements.

25. The apparatus of claim 24 wherein said optical elements are microprisms.

* * * * *